US007626585B2

(12) United States Patent
Kondo et al.

(10) Patent No.: US 7,626,585 B2
(45) Date of Patent: Dec. 1, 2009

(54) IMAGE PROCESSING METHOD, IMAGE PROCESSOR, AND IMAGE PROCESSING PROGRAM

(75) Inventors: Kenji Kondo, Kyoto (JP); Katsuhiro Kanamori, Nara (JP); Kunio Nobori, Osaka (JP)

(73) Assignee: Panasonic Corporation, Osaka (JP)

(*) Notice: Subject to any disclaimer, the term of this patent is extended or adjusted under 35 U.S.C. 154(b) by 287 days.

(21) Appl. No.: 11/788,249

(22) Filed: Apr. 19, 2007

(65) Prior Publication Data
US 2007/0222781 A1 Sep. 27, 2007

Related U.S. Application Data

(63) Continuation of application No. PCT/JP2006/315840, filed on Aug. 10, 2006.

(30) Foreign Application Priority Data
Sep. 1, 2005 (JP) .............................. 2005-253439

(51) Int. Cl.
*G06T 15/50* (2006.01)
(52) U.S. Cl. ................................................... 345/426
(58) Field of Classification Search .................. None
See application file for complete search history.

(56) References Cited

U.S. PATENT DOCUMENTS

| 5,028,138 | A | * | 7/1991 | Wolff | ............................ | 356/369 |
| 5,488,700 | A | * | 1/1996 | Glassner | ...................... | 345/426 |
| 5,557,324 | A | * | 9/1996 | Wolff | ............................ | 345/207 |
| 5,726,755 | A | * | 3/1998 | Wolff | ............................ | 356/364 |
| RE37,752 | E | * | 6/2002 | Wolff | ...................... | 348/207.99 |
| 6,539,126 | B1 | * | 3/2003 | Socolinsky et al. | ......... | 382/274 |
| 7,024,037 | B2 | * | 4/2006 | Zhang et al. | ................. | 382/181 |
| 7,356,447 | B2 | * | 4/2008 | Marschner et al. | ............. | 703/2 |

FOREIGN PATENT DOCUMENTS

| JP | 09-212644 | 8/1997 |
| JP | 10-162146 | 6/1998 |
| JP | 11-41514 | 2/1999 |
| JP | 11-203478 | 7/1999 |
| JP | 11-211433 | 8/1999 |
| JP | 11-313242 | 11/1999 |
| JP | 2002-24818 A | 1/2002 |
| JP | 3459981 | 8/2003 |
| JP | 2005-92549 A | 4/2005 |

OTHER PUBLICATIONS

Wolff et al. Constraining Object Features Using a Polarization Reflectance Model. IEEE Transactions on Pattern Analysis and Machine Intelligence. vol. 13. Issue 7. Jul. 1991.*

(Continued)

*Primary Examiner*—Peter-Anthony Pappas
(74) *Attorney, Agent, or Firm*—Harness, Dickey & Pierce, P.L.C.

(57) ABSTRACT

A polarized image acquisition section shoots a subject through a polarizing element operable to set principal axes of which directions are different from each other. An incident plane specifying section specifies an incident plane of each pixel, and an incident angle computation section computes an incident angle of each pixel. A classifying section clusters pixels similar to each other in both incident plane and incident angle. A reflection component separation section performs reflection component separation on each clustered pixel set on the assumption of probabilistic independence between the diffuse reflection component and the specular reflection component.

15 Claims, 24 Drawing Sheets

OTHER PUBLICATIONS

Farid et al. Separating Reflections and Lighting Using Independent Components Analysis. IEEE Computer Society Conference on Computer Vision and Pattern Recognition. 1999.*

Umeyama et al. Separation of Diffuse and Specular Components of Surface Reflection by Use of Polarization and Statistical Analysis of Images. IEEE Transactions on Pattern Analysis and Machine Intelligence. vol. 26. No. 5. May 2004.*

Nayar et al. Separation of Reflection Components Using Color and Polarization. International Journal of Computer Vision. 1997.*

Bronstein et al. Blind Separation of Reflections Using Spare ICA. $4^{th}$ International Symposium on Independent Component Analysis and Blind Signal Separation. Apr. 2003.*

Wolff. Polarization-Based Material Classification from Specular Reflection. IEEE Transactions on Pattern Analysis and Machine Intelligence. vol. 12. No. 11. Nov. 1990.*

Schafer, Steven A., "Using Color to Separate Reflection Components," Color Research and Application, vol. 10, No. 4, pp. 210-218, 1985.

Iwase, Masaki et al., "A Camera System for Separating Real and Specularly Reflected Images from Their Mixing Images," The Institute of Electronics, D-II, vol, J81-D-II, No. 6, pp. 1224-1232, Jun. 1998 and a partial English translation thereof.

Wolff, L. B., "Using Polarization to Separate Reflection Components," Proc. IEEE Conf. CVPR, pp. 363-369, 1989.

Barter, J. D. et al., "Visible-Regime Polarimetric Imager: A Fully Polarimetric, Real-time Imaging System," Applied Optics-LP, vol. 42, No. 9, pp. 1620-1628 (2003).

Guo, J. et al., "Fabrication of Thin-Film Micro Polarizer Arrays for Visible Imaging Polarimetry," Applied Optics-OT, vol. 39, No. 10, pp. 1486-1492 (2000).

Nishino, K. et al. "The World In An Eye," in Proc. of Computer Vision and Pattern Recognition CVPR '04, vol. I, pp. 444-451, Jul. 2004.

More, Jorge J., "The Levenberg-Marquardt Algorithm: Implementation and Theory," in G. A. Watson (ed.), Lecture Notes in Mathematics 630, Springer-Verlag, Berlin, 1978, 105-116.

Wolff, L. B., "Surface Orientation from Two Camera Stereo With Polarizers," in Proc. Opt. Illumination Image Sensing Machine Vision IV, vol. 1194 (Philadelphia, PA), No. 1989, pp. 287-297.

* cited by examiner

Angles of principal axis (rad)　　0　　π/2

FIG.6
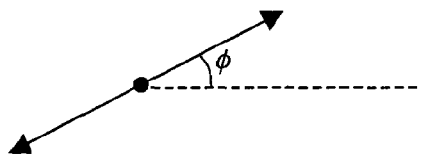
FIG.7
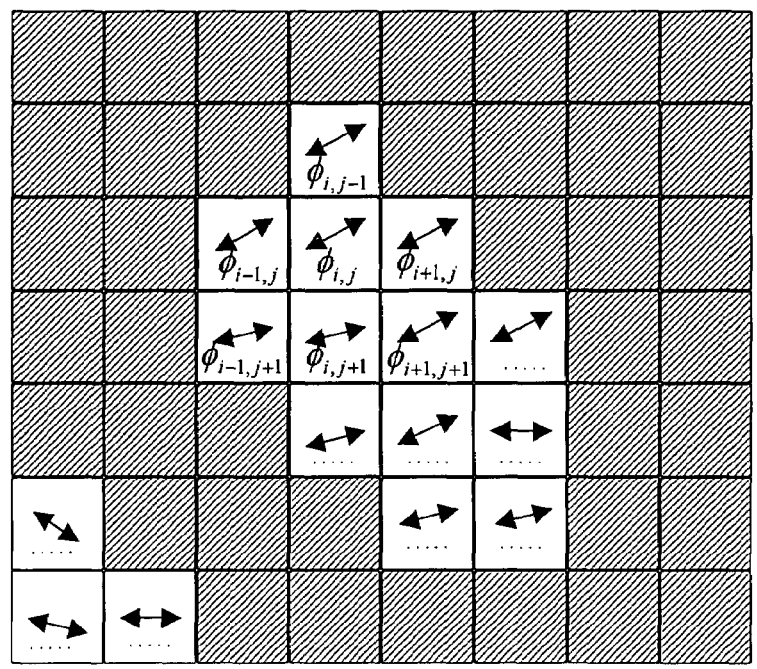
 Pixel in which specular reflection is present
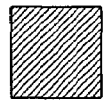 Pixel in which no specular reflection is present □ Pixel in which specular reflection is present ▨ Pixel in which no specular reflection is present Angles of
principal axis    0         π/4        π/2        3π/4
(rad)

Angle of direction of principal axis

FIG.15

※Specular reflection is caused on entire face of subject

2-D distribution A of directions obtained by projecting incident planes measured using polarized element onto image plane

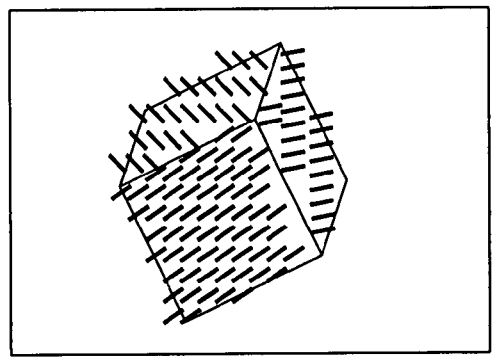

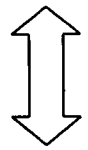  Matching

2-D distribution B of directions obtained by projecting incident planes onto image plane on the assumption of 3-D posture and position in camera coordinate system 3-D geometry model

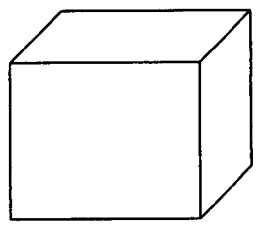 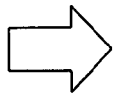 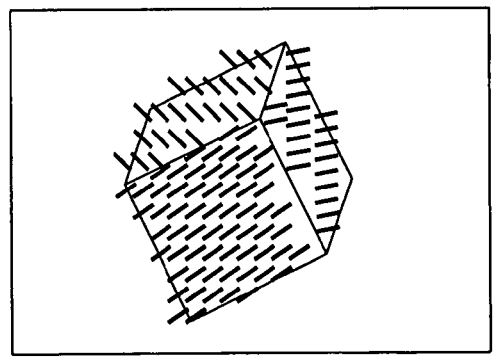

FIG.16
2-D distribution A
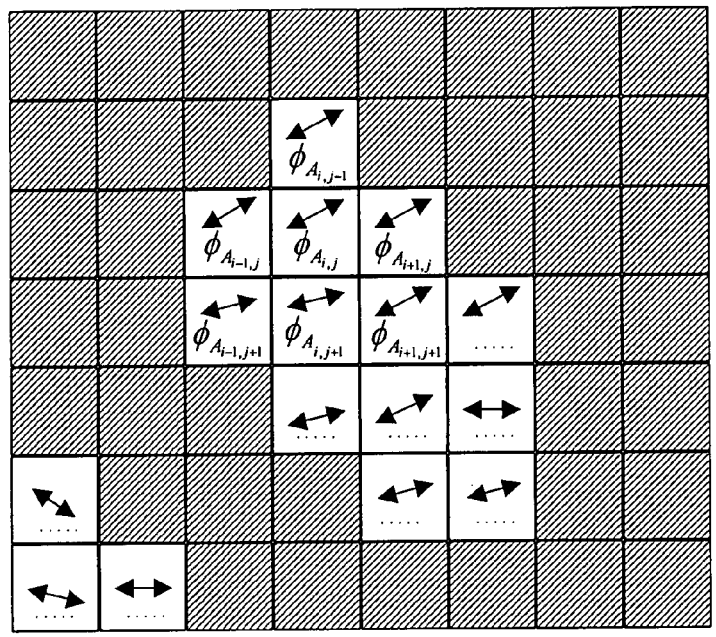
⇕ Agreement degree matching
2-D distribution B
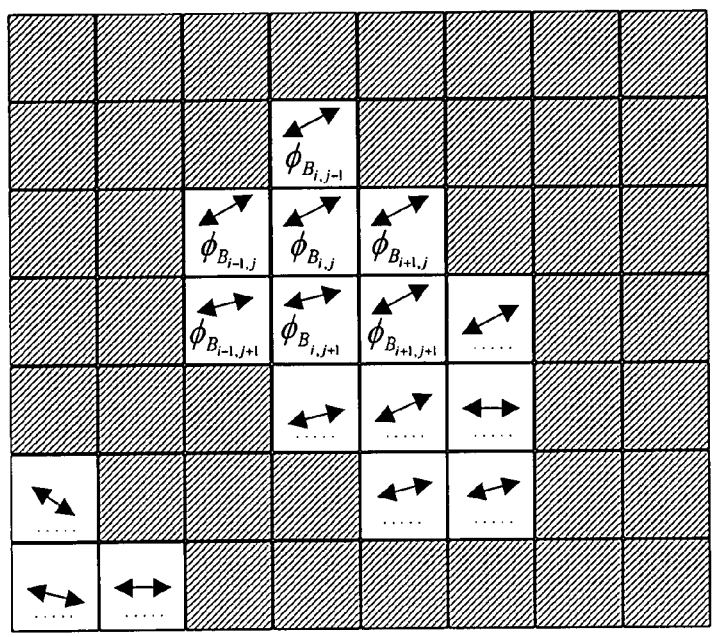
 Pixel in which specular reflection is present
 Pixel in which no specular reflection is present Reflection component before separation
(sum of diffuse reflection component and specular reflection component)

Reflection component after separation (only specular reflection component)

FIG.25A
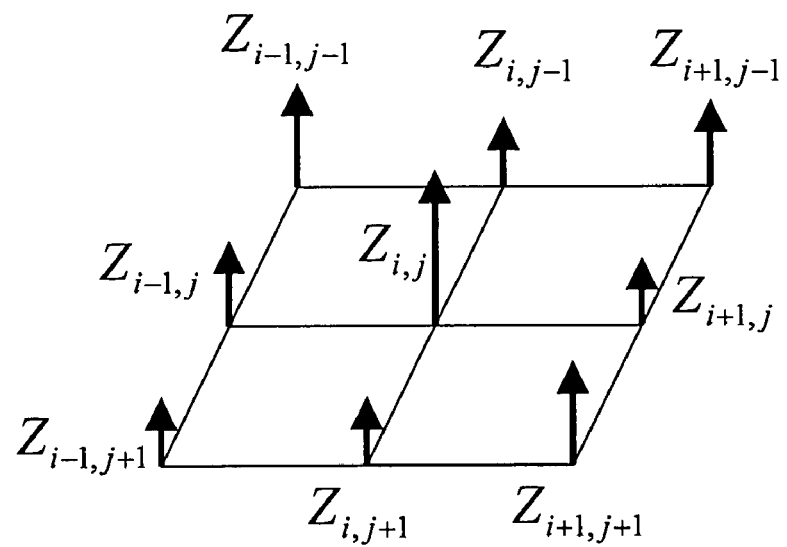
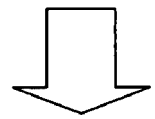
FIG.25B
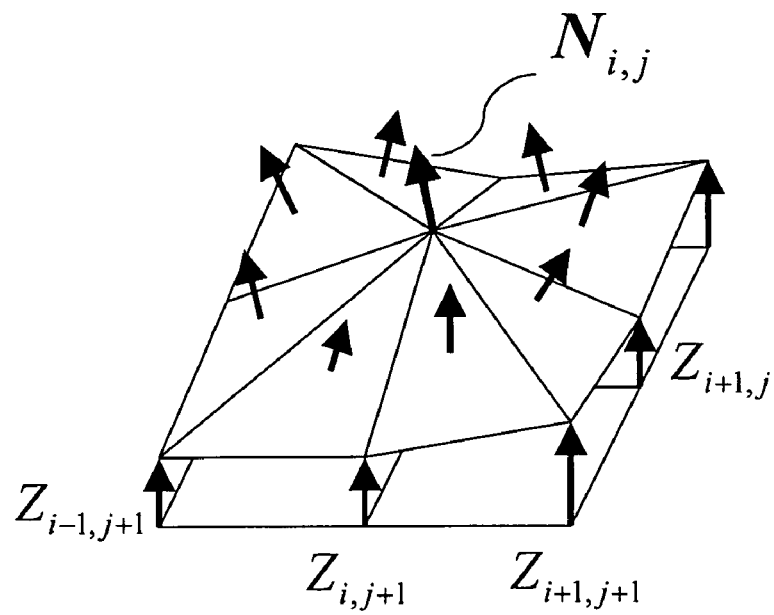

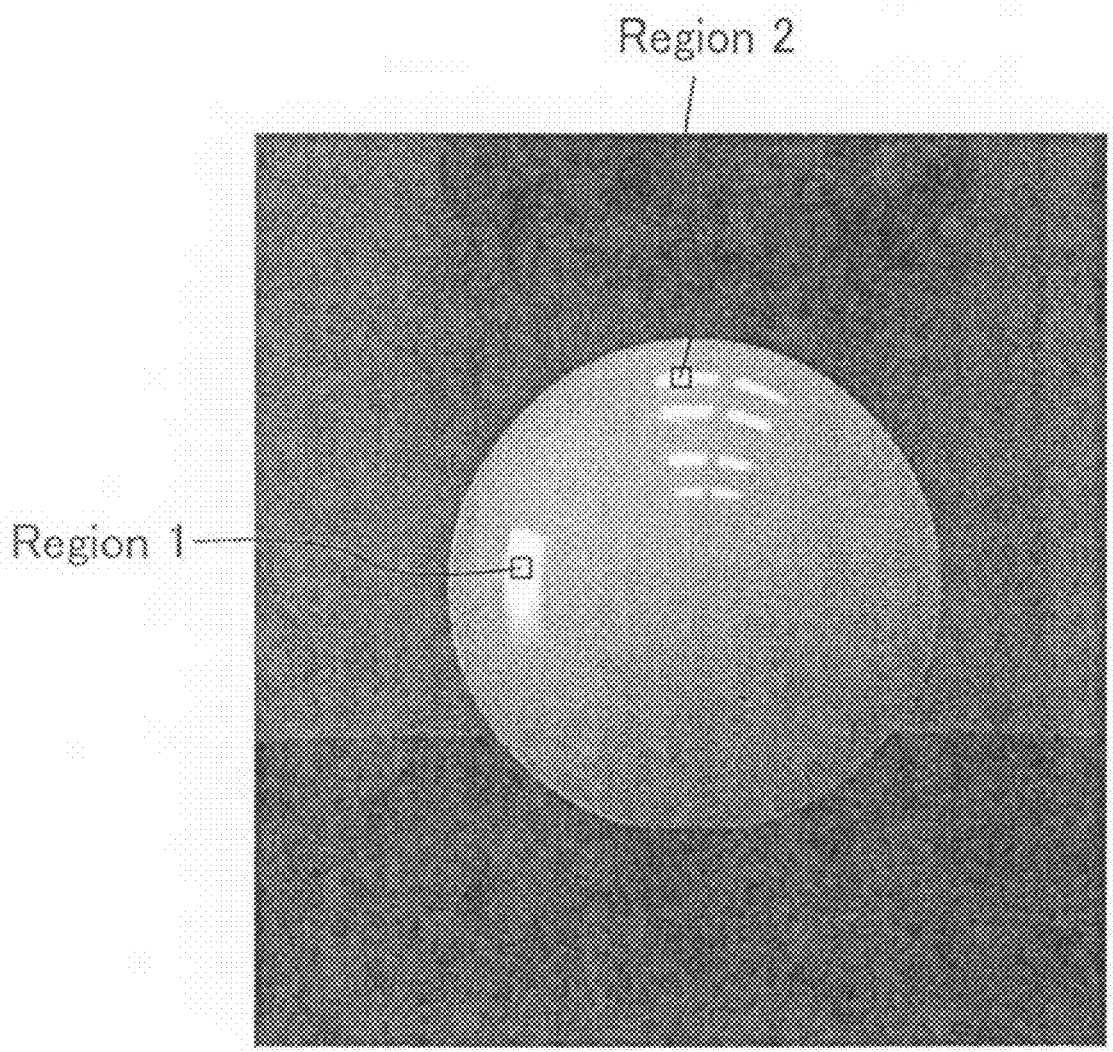

*Viewed from above*

*Viewed from camera*

(Schematic illustration of incident plane)

(Schematic illustration of incident plane)

IMAGE PROCESSING METHOD, IMAGE PROCESSOR, AND IMAGE PROCESSING PROGRAM

CROSS REFERENCE TO RELATED APPLICATIONS

This is a continuation of Application PCT/JP2006/315840 filed on Aug. 10, 2006. This Non-provisional application claims priority under 35 U.S.C. §119(a) on Patent Application No. 2005-253439 filed in Japan on Sep. 1, 2005, the entire contents of which are hereby incorporated by reference.

BACKGROUND OF THE INVENTION

1. Technical Field

The present invention relates to a method for separating the diffuse reflection component and the specular reflection component in images obtained by shooting a subject through a polarizing filter by utilizing probabilistic independence between them, and more particularly relates to a technique enabling reflection component separation in a general illumination condition.

2. Background Art

Reflected light from an object can be expressed by a sum of two components of the specular reflection component and the diffuse reflection component. Reflection by the two components is proposed as a dichromatic reflection model in Non-patent Document 1. The specular reflection component is light reflected at a boundary between the surface of an object and an air layer while the diffuse reflection component is light which passes through the surface of the object, are made incident to the inside of the object, repeats reflection by pigments, and then returned to the air.

Almost all image processing algorithms, such as corresponding point search and photometric stereo premise diffuse reflection, but the specular reflection serves as a factor of lowering performance of various kinds of image processing algorithms. For this reason, various kinds of techniques for separating the specular reflection component and the diffuse reflection component have been proposed.

For separating the specular reflection component and the diffuse reflection component, two types of methods have been proposed: namely, (A) methods utilizing color characteristics of reflected light; and (B) methods utilizing polarization characteristics of specular reflection.

In the methods (A), the reflection components are separated by utilizing difference in color vector on the ground that in a case of a dielectric subject, the diffuse reflected light is reflected at an object color while the specular reflected light is reflected at an illumination color. The methods, however, cannot separate them well when the object color is similar to the illumination color or another object is reflected by inter-reflection. Further, when a subject is made of metal, the separation methods utilizing the color characteristics cannot be applied because some kinds of metal have so large wavelength dependencies of a Fresnel coefficient that the specular reflected light and the illumination light do not agree with each other in color vector.

On the other hand, in the methods (B), the reflection components are separated by utilizing the fact that the specular reflection component are polarized usually while the diffuse reflection component can be regarded as unpolarized light usually. Non-patent Document 2, Non-patent Document 3, Patent Document 1, Patent Document 2, and the like propose methods utilizing polarization. In these methods utilizing polarization, image processing independent from the colors of illumination and an object can be performed, which is the difference from the methods utilizing the color characteristics.

Non-patent Document 2 utilizes the fact that light reflected on the surface of a glass is polarized more strongly than light passing through the glass, and an image reflected in the glass and an image of an object therebehind are separated from each other by obtaining a minimum intensity of each pixel from a plurality of images shot with a polarizing filter mounted to a camera rotated. However, an image reflected in the glass can be separated well only when the incident angle to the glass approximates to a Brewster's angle.

In Non-patent Document 3, a minimum intensity and a maximum intensity are obtained in each pixel of a plurality of images shot with a polarizing filter mounted to a camera rotated, a ratio of a parallel component to a perpendicular component of a Fresnel coefficient is estimated on the basis of the ratio of the intensities so that the specular reflected light and the diffuse reflected light from a subject are separated even when the incident angle is one other than a Brewster's angle. This method stands on the assumption that the diffuse reflection component is uniform in a region where specular reflection is present and, therefore, cannot be applied to a subject having texture of diffuse reflection.

Patent Document 1 uses a polarizing filter for each of an illumination and a camera. A minimum intensity is obtained in each pixel of a plurality of images shot with the polarizing filter mounted to the camera rotated and with the illumination light polarized linearly, and an image composed of the obtained minimum intensities is recorded as a diffuse reflection image. This method utilizes a property of specular reflected light which is polarized completely irrespective of the incident angle when illumination light is polarized completely. This method, however, cannot remove specular reflected light from light other than completely polarized illumination light and, therefore, is utilized only in a mat and black light blocking box, which means inapplicability to a general condition.

In Patent Document 2, on the assumption that there is probabilistic independence between the specular reflection component and the diffuse reflection component, both the components are separated from a plurality of images shot through a polarizing filter. This method can separate the reflection components at an angle other than a Brewster's angle, which is different from Non-patent Document 2, and is applicable to a subject having texture of diffuse reflection, which is different from Non-patent Document 3, and requires no polarization of illumination light, which is different from Patent Document 1.

Prior to description of the method of Patent Document 2, general description will be given to reflection of light from an object and polarization.

In the previously mentioned dichromatic reflection model, the reflected light from an object is expressed by a sum of the two components of the diffuse reflection component and the specular reflection component. The diffuse reflection component $L_{diff}$ is expressed by a Lambertian model expressed by Expression 1 usually.

$$L_{diff} = \kappa_{diff} \max[0, (L_i \cos\theta_i)] \qquad \text{Expression 1}$$

Wherein, $L_i$ is an intensity of incident light, $\theta_i$ is an incident angle, and $\kappa_{diff}$ is a diffuse reflectance of an object. The diffuse reflection component can be regarded as unpolarized light usually.

On the other hand, the specular reflection component $L_{spec}$ is expressed by a Torrance-Sparrow model expressed by Expression 2 usually $$L_{spec} = cF(\theta_i', \eta)G\frac{L_i}{\cos\theta_r}\exp\left(-\frac{\alpha^2}{2\sigma_\alpha^2}\right) \quad \text{Expression 2}$$

Wherein, $L_i$ is an intensity of incident light as well as in the Lambertian model, $\theta_r$ is an angle formed between the normal line of the surface of an object and a view-line direction, a is an angle formed between the normal direction of a microfacet forming the specular reflection and the normal direction of the surface of an object, and $\sigma_\alpha$ is a parameter representing roughness of the surface of an object. Further, F is a Fresnel coefficient about reflected energy and depends on a relative refractive index $\eta$, which is a ratio of an incident angle $\theta'_i$ at a microfacet to refractive indices $\eta_1$ and $\eta_2$ of two media. F is a real number when the media are dielectric, and is represented by n hereinafter. G is a geometric attenuation factor and expresses influence of incident light masking and reflected light shadowing by a microfacet. c is a constant representing a ratio of diffuse reflection and specular reflection.

The specular reflection component is polarized in the presence of difference in Fresnel coefficient between a component parallel to a light incident plane and a component perpendicular thereto. The Fresnel coefficients about reflected energy with respect to the parallel component and the perpendicular component are expressed by Expression 3 and Expression 4, respectively.

$$F_p = \frac{\tan^2(\theta_i' - \theta_i'')}{\tan^2(\theta_i' + \theta_i'')} \quad \text{Expression 3}$$

$$F_s = \frac{\sin^2(\theta_i' - \theta_i'')}{\sin^2(\theta_i' + \theta_i'')} \quad \text{Expression 4}$$

Wherein, $\theta''_i$ is an angle of refraction on a microfacet, and Expression 5 is held from Snell's law.

$$\frac{\sin\theta_i'}{\sin\theta_i''} = \frac{n_2}{n_1} = n \quad \text{Expression 5}$$

Wherein $n_1$ and $n_2$ are a refractive index of a media 1 on the incident side and a refractive index of a media 2 on the refraction side. The ratio of the refractive indices $n_2$ to $n_1$ is represented hereinafter by a relative refractive index n.

FIG. 26 is a graph of Fresnel coefficient with respect to the parallel component and the perpendicular component at an incident plane when the refractive index n is 1.6.

From the foregoing, the intensity $L_r$ of reflected light to incident light as unpolarized light can be expressed by Expression 6. Wherein, $L'_{spec}$ is obtained by subtracting the term of Fresnel intensity reflectance from the specular reflection component $L_{spec}$ expressed by Expression 2.

$$L_r = L_{diff} + \frac{1}{2}(F_p(\theta_i', n) + F_s(\theta_i', n))L'_{spec} \quad \text{Expression 6}$$

In the case where reflected light from an object is observed through a polarizing filter, the intensity thereof is an intensity of a component parallel to the principal axis of the polarizing filter in reflected light before passing through the polarizing filter. When the reflected light from the object is observed through the rotating polarizing filter, the intensity varies as in a sine function as in FIG. 27 according to the angle of the principal axis of the polarizing filter. As shown in FIG. 26, the perpendicular component of the reflected light is larger than the parallel component thereof with respect to an incident plane at almost all incident angles. Accordingly, the intensity of the observed specular reflection component is minimum when the principal axis of the polarizing filter is parallel to the incident plane (when an angle $\psi$ formed between the principal axis of the polarizing filter and the incident plane is 0 rad) while being maximum when it is perpendicular thereto (when the angle $\psi$ formed between the principal axis of the polarizing filter and the incident plane is $\pi/2$ rad). The diffuse reflection component can be regarded as unpolarized light and, accordingly, is constant regardless of the direction of the principal axis of the polarizing filter.

In a Torrance-Sparrow model, it is supposed that specular reflection is caused by reflecting incident light at a microfacet on the surface of an object. Accordingly, the incident plane and the local incident angle of the specular reflection component in each pixel of an observed image are determined by the direction of a light source and the view-line direction of a camera and is independent from the normal direction of the surface of an object.

The method of Patent Document 2 assumes a light source being sufficiently far away and an orthographic model being as a camera model. In this case, as shown in FIG. 33, the incident plane and the local incident angle can be considered to be the same in every pixel in which specular reflection is present in a shot image. Herein, the words "the incident plane is the same" mean that directions in which the incident planes of target pixels are projected onto an image plane as in FIG. 5 are equal to each other in every pixel in which specular reflection is present. At the same time, it is assumed that the refractive index of an object is uniform. Under the above assumptions, the Fresnel coefficients of all the pixel corresponding to an object become the same, and every pixel has the same phase of intensity variation of specular reflection when the polarizing filter is rotated.

Herein, when $I_d$, $I_s$, and I are a diffuse reflection image vector, a specular reflection image vector, and an observed image vector, respectively, the relationship expressed by Expression 7 is held. Each vector $I_d$, $I_s$, I is a column vector having dimensions of which number is equal to the number of pixels. $f(\psi)$ is a function (scalar) of an angle $\psi$ formed between the principal axis of a polarizing filter and an incident plane.

$$I = I_d + f(\psi)I_s \quad \text{Expression 7}$$

FIG. 28 shows the relationship thereamong. The observed image vector increases and decreases in the range between $f(0)I_s$ and $f(\pi/2)I_s$. When a plurality of image vectors, for example, two image vectors $I_1$, $I_2$ are observed through a polarizing filter having principal axes different from each other, the direction of the specular reflection image vector $I_s$ is obtained from the difference $(I_1-I_2)$ therebetween, as shown in FIG. 29. Accordingly, when the vector of this difference is multiplied by an appropriate constant k and is subtracted from the observed image vector, the diffuse reflection image vector $I_d$ can be obtained.

The method of Patent Document 2 obtains, on the assumption of the probabilistic independence between the diffuse reflection image vector $I_d$ and the specular reflection image vector $I_s$, the coefficient $f(\psi)$ and both the vectors. Specifically:

(1) A matrix having row vectors of a plurality of observed image as elements is decomposed into the form of a product by utilizing a maximum rank decomposition.

(2) An arbitrary 2×2 nonsingular matrix is introduced to determine temporally a diffuse reflection image vector candidate and a specular reflection image vector candidate.

(3) By evaluating mutual information content of them, a diffuse reflection image vector, a specular reflection image vector, and a coefficient $f(\psi)$ matrix when the mutual information content is minimum (probabilistic independence is maximum) are employed as estimation values.

Patent Document 1: Japanese Patent Application Laid Open Publication No. 11-41514A Patent Document 2: Japanese Patent No. 3459981

Non-patent Document 1: S. Shafer, "Using color to separate reflection components," Color Research and Applications, vol. 10, no. 4, pp. 210-218, 1985

Non-patent Document 2: Masaki Iwase, Tsuyoshi Yamamura, Toshimitsu Tanaka, and Noboru Ohnishi, "A camera system for separating real and specularly reflected images from their mixing images," the transaction of the Institute of Electronics, Information and Communication, D-II, Vol. J81-D-II, No. 6, pp. 1224-1232, June, 1998

Non-patent Document 3: L. B. Wolff, "Using polarization to separate reflection components," Proc. IEEE conf. CVPR, pp. 363-369, 1989

SUMMARY OF THE INVENTION

Problems that the Invention is to Solve

The method of Patent Document 2 assumes a parallel light source (equivalent to a state in which a light source is sufficiently far away) and an orthographic model as a camera model, as shown in FIG. 33. In ordinary environment where we live, however, the assumption of parallel light is hardly held. Though the outdoor sunlight in a fine day can be regarded as parallel light, it in a cloudy day cannot be regarded as parallel light because the sky serves as a surface light source of diffuse light as a whole. As well, in the case where an illumination tool having size to some extent is present at a short distance indoor or a plurality of illumination tools are present indoor, the light cannot be regarded as parallel light. In addition, outdoor and indoor light where mutual reflection is present cannot be regarded as parallel light.

FIG. 30 is an image obtained by shooting a rubber-made solid sphere having a smooth surface under a condition shown in FIG. 31. As can be understood from FIG. 31, fluorescent lighting tubes are installed on the left of and above the rubber sphere as a subject. In FIG. 30, a specular reflection region 1 and a specular reflection region 2 are caused on the rubber sphere as the subject by a fluorescent lighting tube A and a part of a fluorescent lighting tube group B, respectively. These specular reflections are caused by illuminations different in direction, and therefore, the illumination environment as a whole cannot be regarded as parallel light. Accordingly, the pixels have different phases of intensity variation of specular reflection when the polarizing filter set before the camera is rotated. FIG. 32 is a graph showing variation in intensities in the small region 1 and the small region 2 in FIG. 30 with respect to the angle of the polarizing filter set before the camera. The polarizing filter is rotated up to 180 degrees ten degrees by ten degrees with a given reference direction set as zero degree. The phases of intensities are almost inversed between the region 1 and the region 2 and do not become the same. Hence, the method of Patent Document 2 cannot separate the specular reflection under the above illumination condition.

The present invention has been made in view of the foregoing and has its object of separating the diffusion and specular reflection components from an image obtained by shooting a subject through a polarizing filter even under an ordinary illumination condition.

Means of Solving the Problems

The present invention is provided for separating into the diffuse reflection component and the specular reflection component intensities of pixels of a plurality of images obtained by shooting a subject under an arbitrary illumination condition through polarizing element operable to set principal axes different from each other in direction in such a manner that: an incident plane is specified and an incident angle is computed in each pixel of an image group in which specular reflection is present; pixels similar to each other in both incident plane and incident angle are clustered in the pixel group to form at least one pixel set; and reflection component separation is performed on the pixel set on the assumption of probabilistic independence between the diffuse reflection component and the specular reflection component.

In the present invention, after an incident plane and an incident angle are obtained in each pixel in the pixel group in which specular reflection is present, pixels similar to each other in both of them are clustered and reflection component separation utilizing probabilistic independence is performed on each clustered pixel set. Accordingly, even in the case where specular reflected light of various incident planes and incident angles are present in images shot under an arbitrary illumination condition, pixels similar to each other in both incident plane and incident angle are clustered and reflection component separation are performed on each clustered pixel set. This achieves accurate reflection component separation even when the incident planes and the incident angles are different pixel by pixel. Hence, the diffuse reflection component and the specular reflection component can be separated in images shot under an ordinary illumination condition.

It should be noted that in order to enable reflection component separation utilizing probabilistic independence, the refractive index of a subject must be substantially uniform in each pixel set. If the subject is optically smooth in a local region corresponding to each one pixel of shot images, the incident plane and the incident angle of the pixel can be considered to be constant, and therefore, further accurate reflection component separation can be achieved.

FIG. 34 shows a state in which specular reflected light caused in a given incident plane under a non-parallel light condition is made incident to a central projection camera. FIG. 34 shows that clustering of incident angles results in classification into three of (a), (b), and (c). When reflection component separation utilizing probabilistic independence is performed on each of (a), (b), and (c), the diffuse reflection component and the specular reflection component can be separated.

EFFECTS OF THE INVENTION

According to the present invention, the diffuse and specular reflection components can be separated from images obtained by shooting a subject through a polarizing filter even under an ordinary illumination condition.

BRIEF DESCRIPTION OF THE DRAWINGS

FIG. 6 is an illustration explaining an angle expressing a direction of an incident plane formed by projecting an incident plane of specular reflection onto an image plane.

FIG. 7 is an illustration showing a two-dimensional distribution of directions of incident planes.

FIG. 15 is an illustration showing a state in which a two-dimensional distribution of directions of incident planes is utilized for determining a three-dimensional posture and a three-dimensional position of a subject.

FIG. 16 is an illustration showing a state in which two-dimensional distributions of directions of incident planes are matched for determining a three dimensional posture and a three-dimensional position of a subject.

FIG. 25 is an illustration showing an example of a method for computing a normal line from a depth image.

FIG. 30 is an image obtained by shooting a spherical subject under a condition where illuminations are present on plural sides.

DESCRIPTION OF THE PREFERRED EMBODIMENTS

Figure 1:
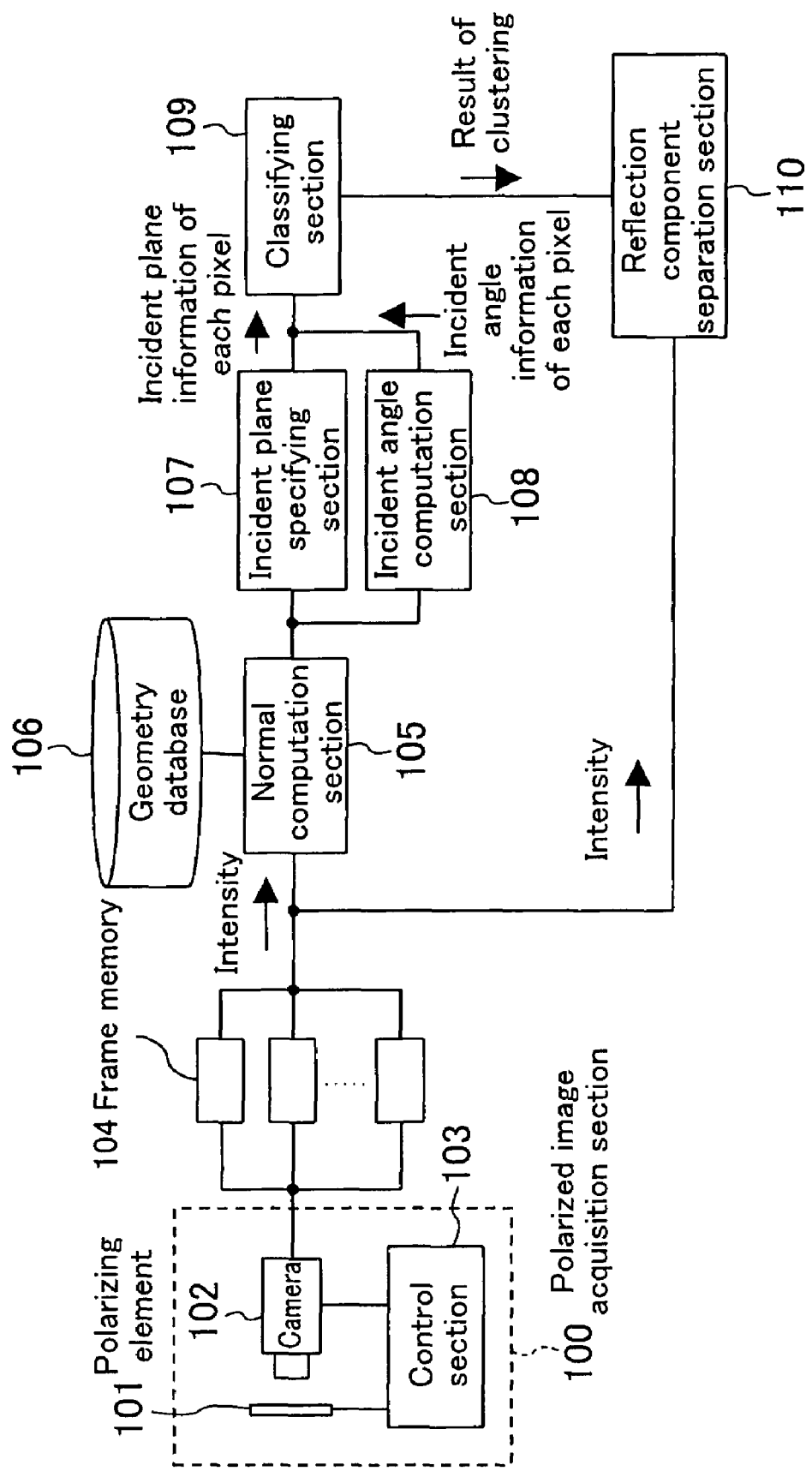
FIG. 1 is a block diagram showing a configuration example of an image processor according to Embodiment 1 of the present invention.

A first aspect of the present invention provides an image processing method including the steps of: (a) shooting a plurality of images of a subject under an arbitrary illumination condition by a camera through a polarizing element operable to set principal axes of which directions are different from each other; (b) specifying an incident plane of each pixel of a pixel group in which specular reflection is present in the plurality of shot images; (c) computing an incident angle of each pixel of the pixel group in the plurality of shot images; (d) forming at least one pixel set by clustering pixels similar to each other in both incident plane and incident angle in the pixel group; and (e) performing reflection component separation on the pixel set on an assumption of probabilistic independence between a diffuse reflection component and a specular reflection component to separate intensities of all the pixels thereof into the diffuse reflection component and the specular reflection component.

A second aspect of the present invention provides the image processing method of the first aspect, wherein the step (b) includes the steps of: computing a normal vector of the subject in each pixel of the pixel group; and specifying an incident plane of each pixel of the pixel group from the computed normal vector of the subject in the pixel and a view-line vector in the pixel.

A third aspect of the present invention provides the image processing method of the first aspect, wherein the step (c) includes the steps of: computing a normal vector of the subject in each pixel of the pixel group; and computing an incident angle of each pixel of the pixel group from the computed normal vector of the subject in the pixel and a view-line vector in the pixel.

A fourth aspect of the present invention provides the image processing method of the second or third aspect, wherein the normal vector computing step includes the step of: estimating a three-dimensional position and a three-dimensional posture of the subject in a camera coordinate system with the use of known three-dimensional geometry data of the subject on the basis of appearance of the subject in the shot images, and a normal vector of the subject in each pixel of the pixel group is computed with the use of the estimated three-dimensional position and the estimated three-dimensional posture of the subject.

A fifth aspect of the present invention provides the image processing method of the first aspect, wherein the step (b) includes, when number of the shot images is three or larger, the step of: detecting, in each pixel of the pixel group, a phase of intensity variation with respect to an angle of the principal axis of the polarizing element, and an incident plane is specified from the detected phase.

A sixth aspect of the image processing method of the fifth aspect, wherein the step (c) includes the steps of: computing a normal vector of the subject in each pixel of the pixel group; and computing an incident angle of each pixel of the pixel group from the computed normal vector of the subject in the pixel and a view-line vector in the pixel, and the normal vector computing step includes, when number of the shot images is three or larger, the steps of: computing a first two-dimensional distribution of directions obtained by projecting on an image plane the incident plane of each pixel of the pixel group, which is specified in the step (b); supposing a three-dimensional position and a three-dimensional posture of the subject in a camera coordinate system with the use of a known three-dimensional geometry model of the subject, calculating an incident plane of each pixel on an image plane on which the three-dimensional geometry model having the supposed three-dimensional position and the supposed three-dimensional posture is projected, and computing a second two-dimensional distribution of directions obtained by projecting the calculated incident planes onto an image plane; determining a three-dimensional position and a three-dimensional posture of the subject by matching the first and second two-dimensional distributions; and computing a normal vector of the subject in each pixel of the pixel group on the basis of the determined three-dimensional position and the determined three-dimensional posture of the subject.

A seventh aspect of the present invention provides the image processing method of the first aspect, wherein after the step (b), a provisional clustering step of forming at least one pixel set by provisionally clustering pixels similar to each other in incident plane in the pixel group is executed, the step (e) is executed thereafter on the pixel set formed in the provisional clustering step, and then, the steps (c), (d), and (e) are repeated by a predetermined number of times, and the step (c) includes the steps of: computing a normal vector of the subject in each pixel of the pixel group with the use of the diffuse reflection component obtained in the previously executed step (e); and computing an incident angle of each pixel of the pixel group from the computed normal vector of the subject in the pixel and a view-line vector in the pixel.

An eighth aspect of the present invention provides the image processing method of the first aspect, which includes, when number of the shot images is three or larger, the steps of: computing, from intensity variation of the specular reflection component with respect to an angle of the principal axis of the polarizing element, a maximum value and a minimum value of intensity of a target pixel of the pixel group; and computing a refractive index of the subject from a ratio of the computed maximum value to the computed minimum value and an incident angle of the target pixel computed in the step (c).

A ninth aspect of the present invention provides the image processing method of the first aspect, which includes, when number of the shot images is three or larger, the steps of: computing, from intensity variation of the specular reflection component with respect to an angle of the principal axis of the polarizing element, a minimum value of intensity of a target pixel of the pixel group; and when the computed minimum value is smaller than a predetermined first threshold value, judging an incident angle of the target pixel computed in the step (c) as a Brewster's angle and computing a refractive index of the subject from the Brewster's angle.

A tenth aspect of the present invention provides the image processing method of the first aspect, which includes, when the number of the shot images is three or larger, the steps of: computing, from intensity variation of the specular reflection component with respect to an angle of the principal axis of the polarizing element, a maximum value and a minimum value of intensity of a target pixel of the pixel group; and computing, when the computed minimum value is equal to or larger than a predetermined second threshold value, a refractive index of the subject from a ratio of the computed maximum value to the computed minimum value and the incident angle of the target pixel computed in the step (c).

An eleventh aspect of the present invention provides an image processor including: a polarized image acquisition section which shoots a subject under an arbitrary illumination condition through a polarizing element operable to set principal axes of which directions are different from each other; an incident plane specifying section which specifies an incident plane of each pixel of a pixel group in which specular reflection is present in a plurality of images shot by the polarized image acquisition section through the polarizing element operable to set principal axes of which directions are different from each other; an incident angle computation section which computes an incident angle of each pixel of the pixel group in the plurality of images; a classifying section which forms at least one pixel set by clustering pixels similar to each other both in incident plane specified by the incident plane specifying section and in incident angle specified by the incident angle computation section; and a reflection component separation section which performs reflection component separation on the pixel set formed by the classifying section on an assumption of probabilistic independence between a diffuse reflection component and a specular reflection component to separate intensities of all the pixels thereof into the diffuse reflection component and the specular reflection component.

A twelfth aspect of the present invention provides an image processing program embedded in a computer readable medium which allows a computer to executes: processing of taking a plurality of images of a subject shot under an arbitrary illumination condition through a polarizing element operable to set principal axes of which directions are different from each other and specifying an incident plane of each pixel of a pixel image group in which specular reflection is present in the plurality of images; processing of computing an incident angle of each pixel of the pixel group in the plurality of images; processing of forming at least one pixel set by clustering pixels similar to each other in both incident plane and incident angle in the pixel group; and performing reflection component separation on the pixel set on an assumption of probabilistic independence between a diffuse reflection component and a specular reflection component to separate intensities of all the pixels thereof into the diffuse reflection component and the specular reflection component.

A thirteenth aspect of the present invention provides an image processing method, including the steps of: shooting a plurality of images of a subject under an arbitrary illumination condition by a camera through a polarizing element operable to set principal axes of which directions are different from each other; specifying on the shot images a region uniform in refractive index and optically smooth in a local region; specifying an incident plane of each pixel of a pixel group in which specular reflection is present in the region of the plurality of shot images; computing an incident angle of each pixel of the pixel group in the region in the plurality of shot images; forming at least one pixel set by clustering pixels similar to each other in both incident plane and incident angle in the pixel group; and performing reflection component separation on the pixel set on an assumption of probabilistic independence between a diffuse reflection component and a specular reflection component to separate intensities of all the pixels thereof to the diffuse reflection component and the specular reflection component.

A fourteenth aspect of the present invention provides the image processing method of the fourteenth aspect, wherein the subject is a human face, and in the region specifying step, an eye region or an eyeglass lens region is specified as the region.

Embodiments of the present invention will be described below with reference to the accompanying drawings.

Various conditions in the embodiments of the present invention will be described first.

Illumination may not necessarily be parallel light. Namely, illumination may be plural in number and one of them may be a surface light source rather than a point light source. Reflected light from another subject can be considered to be illumination and, therefore, may be present. Further, knowledge about the spectral characteristics and the direction of illumination are unnecessary.

It is assumed that a subject is substantially uniform in refractive index and has a property that a local region is optically smooth. The reason why "the refractive index must be substantially uniform" is the same as that in Patent Document 2. Namely, when pixels in which specular reflection is present in shooting the subject are substantially uniform in refractive index and have the same incident plane and incident angle of specular reflection, Fresnel coefficients of the pixels are substantially the same, enabling specular reflection separation utilizing probabilistic independence. Herein, the refractive index is not necessarily uniform in the strict sense and may be uniform only to the extent that Fresnel coefficients can be considered to be uniform and specular reflection separation utilizing probabilistic independence can be enabled.

The words "optically smooth in a local region" means that the normal lines of microfacets in the local region agree with each other substantially and the normal lines of microfacets and a macro normal line that presents the shape of a subject can be considered to be the same. Even if a surface light source is present all around such a subject when observing a local region on the subject in which specular reflection is caused, the specular reflection in the local region can be supposed to be caused by incident light in one direction. In other words, in observing specular reflection by a camera, the directions of the normal lines of microfacets agree with each other in a local region on the subject which corresponds to one pixel in each shot image, with a result that the incident planes and the incident angles of the specular reflection agree with each other, respectively. Wherein, the local region must be smooth while the subject may not be smooth in a broad view. Namely, the edge line (normal edge) of which macro normal line changes spatially discontinuously may be present.

Referring to the shape of a subject, at least a direction of the macro normal line (normal lines of microfacets) in a region in which specular reflection is caused must be known. In Embodiment 1 below, the normal direction is obtained by obtaining a three-dimensional position and a three-dimensional posture of a subject with the use of a known geometric model of the subject. While in Embodiment 2, the normal direction is obtained in such a manner that stereo vision is performed with the use of a separated diffuse reflection component and processing of reflection component separation is repeated with the use of the normal direction obtained from the stereo vision.

As to a camera model, any arbitrary model may be used, such as perspective projection or the like.

Table 1 indicates comparison of various conditions that the present invention and Patent Document 2 premise.

TABLE 1

|  | Light source | Camera model | Subject |
| --- | --- | --- | --- |
| Present invention | arbitrary | arbitrary | Optically smooth |
| Patent Document 2 | Parallel light | Orthogonal projection | arbitrary |

Embodiment 1

FIG. 1 is a block diagram showing a configuration of an image processor that executes an image processing method according to Embodiment 1 of the present invention.

The image processor includes a polarized image acquisition section 100, a frame memory 104, a normal computation section 105, a geometry database 106, an incident plane specifying section 107, an incident angle computation section 108, a classifying section 109, and a reflection component separation section 110. The polarized image acquisition section 100 includes a polarizing element 101, a camera 102, and a control section 103.

Figure 2:
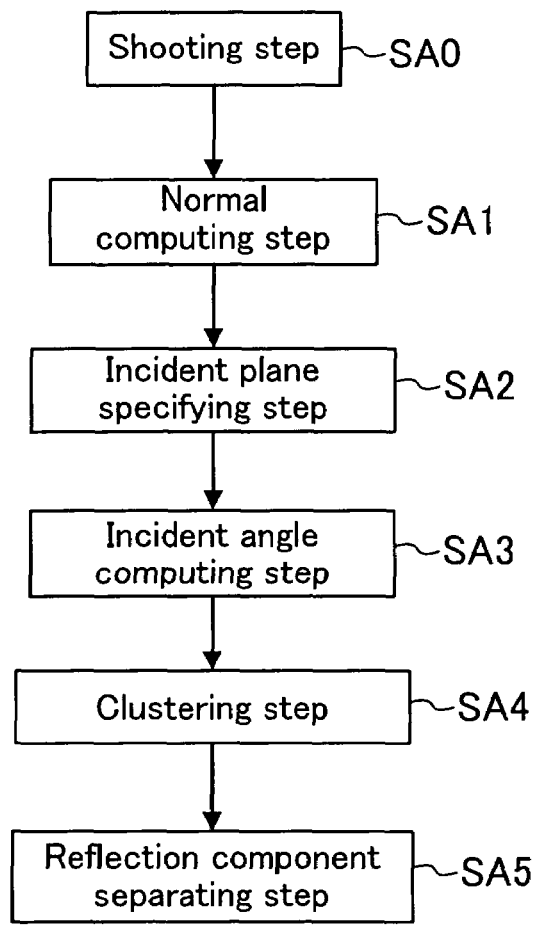
FIG. 2 is a flowchart depicting an image processing method according to Embodiment 1 of the present invention.

FIG. 2 is a flowchart of the image processing method according to Embodiment 1 of the present invention.

The image processing method and the image processor according to the present embodiment will be described below with reference to the block diagram of FIG. 1 and the flowchart of FIG. 2.

First, images of a subject are shot in the polarized image acquisition section 100 (SA0).

Figure 3:
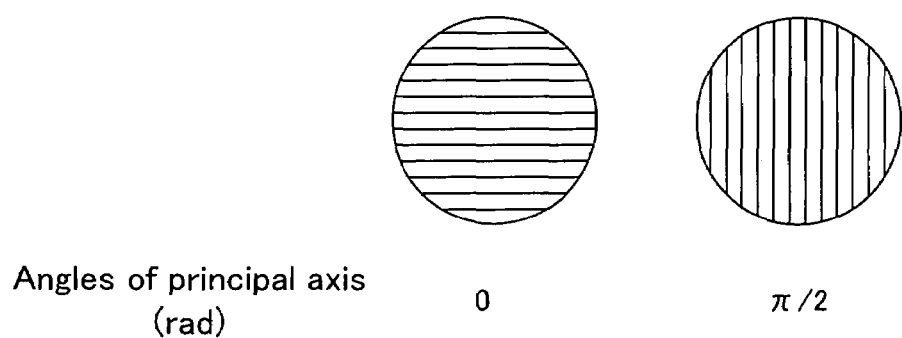
FIG. 3 is an illustration showing directions of a principal axis of a polarizing filter in Embodiment 1 of the present invention.

The control section 103 changes the angle of the direction of the principal axis of the polarizing element 101 to F angles (F=2 in the present embodiment) and controls a shooting timing of the camera 102 so that the camera 102 shoots images with the direction of the principal axis changed to each angle. The obtained F images are stored in the frame memory 104. In the present embodiment, a linear polarizing filter, which is used as the polarizing element 101, is rotated by a motor or the like to change the angle of the principal axis. As the angle of the principal axis, two angles of 0 and $\pi/2$(rad)

are used as shown in FIG. 3. It is unnecessary for the present image processor to know the values of these angles. As the camera 102, a camera is used which has a dynamic range and quantization bits capable of sufficiently obtaining texture of diffuse reflection for pixels in which specular reflection is present in an exposure condition where the intensity of the specular reflection is not saturated. Further, inside parameters, such as a focus length, image centric coordinates, a pixel pitch of the imaging element, and a lens distortion are computed by camera calibration in advance. These parameters are used in a normal computing step SA1.

When difference in intensity of which values are equal to or larger than a predetermined value is present between corresponding pixels in the two shot images, it is judged that specular reflection is present in the pixels. Suppose that the two shot images are $I_1(x, y)$ and $I_2(x, y)$, when an intensity difference $Th_1$ equal to or larger than the predetermined value is present between the intensities $I_1(x_p, y_p)$ and $I_2(x_p, y_p)$ of a target pixel point $(x_p, y_p)$ on a subject as in FIG. 8, it is judged that specular reflection is present at the pixel point $(x_p, y_p)$.

$$|I_1(x_p, y_p) - I_2(x_p, y_p)| \geq Th_1 \qquad \text{Expression 8}$$

It is noted that with three or more the directions of the principal axis of the polarizing element 101, judgment as to whether or not an amplitude obtained by fitting a sine (cosine) function to the intensity variation is equal to or larger than a predetermined value leads to judgment as to whether or not specular reflection is present.

The following processing is directed to only a pixel group in which specular reflection is present.

Though an orthographic model is assumed as a camera model in Patent Document 2, a perspective projection model can be applicable as well in the present invention when the polarizing element has no incident angle dependency. For example, when a polarizing element having an effective incident angle of ±20 degrees is used, a central projection camera can be used of which angle of view is up to 40 degrees.

The two axes of 0 and π/2 intersected at a right angle with each other are used as the angles of the principal axis herein, but any angles may be used only when intensity difference is caused in observed specular reflection.

A plurality of polarized images are acquired by physically rotating the polarizing filter herein, but an element capable of electrically controlling the direction of the principal axis by using liquid crystal may be used as disclosed in Japanese Patent Application Laid Open Publication No. 11-313242A, for example. Alternatively, by using a plurality of imaging elements, a plurality of polarizing filter, and a prism for separating an optical path, images through the polarizing filters having principal axes different from each other in direction may be obtained at the same timing, as disclosed in "J. D. Barter, H. R. Thompson, and C. L. Richardson: "Visible-Regime polarimetric imager: a fully polarimetric, real-time imaging system," Applied Optics-LP, Vol. 42, No. 9, pp. 1620-1628 (2003)". Or, as disclosed in "J. Guo and D. Brady: "Fabrication of thin-film micro polarizer arrays for visible imaging polarimetry," Applied Optics-OT, Vol. 39, No. 10, pp. 1486-1492 (2000)," a micro polarizing plate array may be used in which micro polarizing filters having principal axes different from each other in direction are arranged on each pixel of an imaging element.

Next, the normal direction on the subject is computed in the normal computation section 105 (SA1). The present image processor has knowledge about three dimensional geometry of the subject to be shot (which is stored in the geometry database 106 in advance). The normal computation section 105 obtains the three-dimensional geometry data of the subject from the geometry data base 106 and estimates the three-dimensional posture and the three-dimensional position of the subject from the appearance of the subject in the shot images. An example of estimation of a three-dimensional position and a three-dimensional posture from appearance in the case where a subject is human's cornea is disclosed in "K. Nishino and S. K. Nayar: "The World in an Eye," in Proc. of Computer Vision and Pattern Recognition CVPR '04, Vol. I, pp. 444-451, July 2004." Though a subject of which three-dimensional position and three-dimensional posture can be estimated from appearance is limited, the method of the above document can be applied to the present invention when such the subject is a limited one.

Estimation of the three-dimensional posture and the three-dimensional position of the subject leads to computation of a unit normal vector $N=(n_x, n_y, n_z)$ at an arbitrary point on the subject in a camera coordinate system. The above processing is repeated for all pixels of the shot images in which specular reflection is present to compute the normal vector N of the subject.

Referring to a special example, when the subject is a solid sphere as represented in FIG. 30, only fitting of a circle to the contour thereof results in computation of the normal vector N of each pixel of the shot solid sphere in the camera coordinate system.

Next, in the incident plane specifying section 107, an incident plane when the specular reflection on the subject is observed by the camera is specified in each pixel in which the specular reflection is present (SA2). With the use of the inside parameters obtained in advance, such as the focus length, the image centric coordinates, the pixel pitch of the imaging element, and the lens distortion, a view-line vector V at a target pixel on the subject is determined. A method for determining a view-line vector V will be described with reference to FIG. 4.

Figure 4:
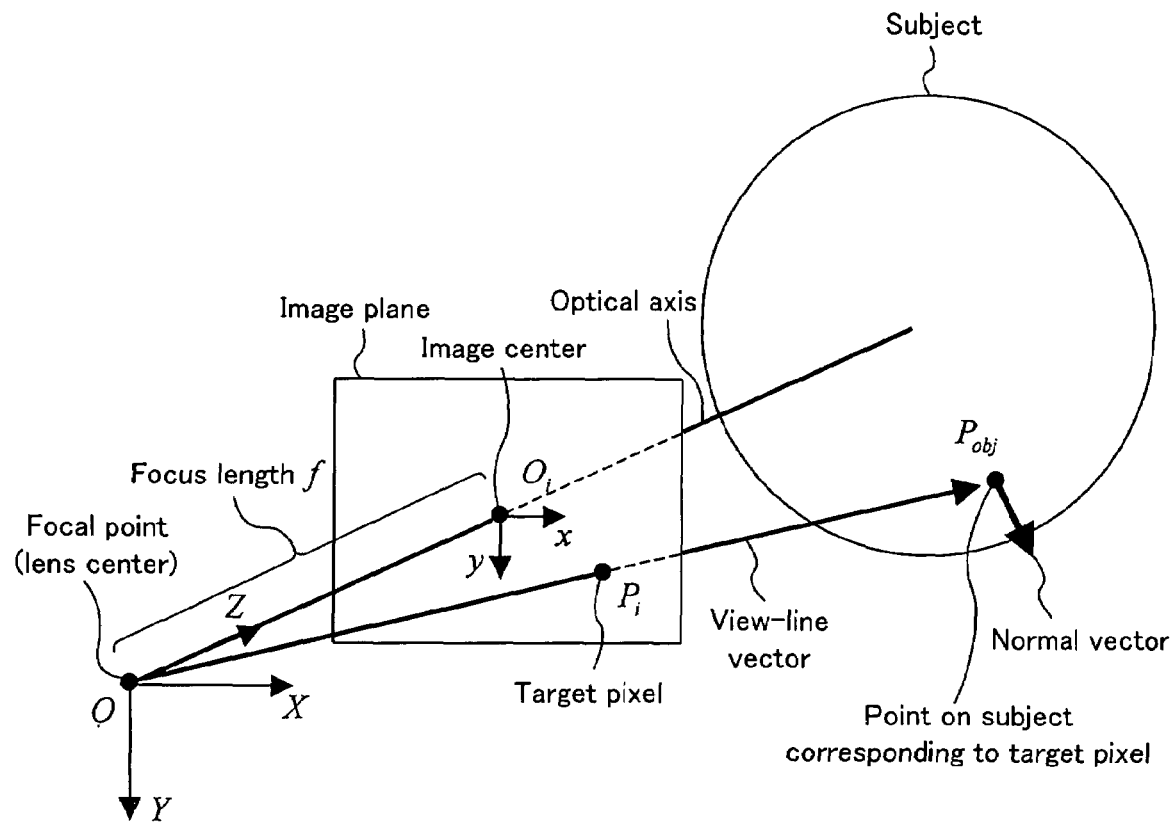
FIG. 4 is an illustration explaining a coordinate system in each embodiment of the present invention.

As in FIG. 4, consider a camera coordinate system O-X-Y-Z and an image coordinate system $O_i$-x-y. The focus length obtained by camera calibration is indicated by f, image centric coordinates $O_i$ is expressed by $(x_o, y_o)$, and pixel pitches in the x direction and the y direction are indicated by $d_x$ and $d_y$, respectively. The lens distortion and setting displacement of the imaging element (the optical axis being not perpendicular to the element plane, and the like) are supposed to be corrected. Suppose that the coordinates of a target pixel $P_i$ corresponding to a point $P_{obj}$ on the subject is $(x_p, y_p)$, the view-line vector V toward the point $P_{obj}$ on the subject is expressed by Expression 9.

$$V = \left( \frac{d_x \cdot (x_p - x_o)}{c}, \frac{d_y \cdot (y_p - y_o)}{c}, \frac{f}{c} \right) \qquad \text{Expression 9}$$

Wherein $$c = \sqrt{\{d_x \cdot (x_p - x_o)\}^2 + \{d_y \cdot (y_p - y_o)\}^2 + f^2}$$

Figure 5:
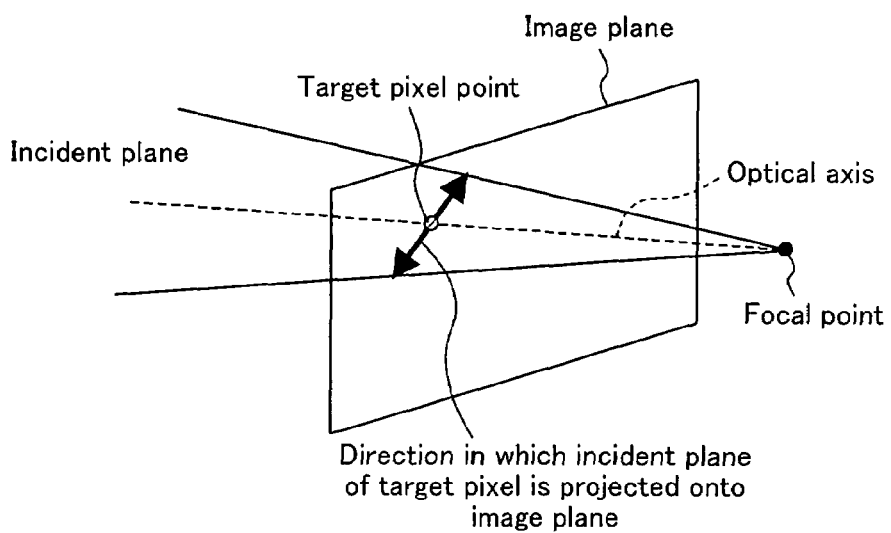
FIG. 5 is an illustration showing a straight line (a direction of an incident plane) formed by projecting an incident plane of specular reflection onto an image plane.

Accordingly, the incident plane when the point $P_{obj}$ is observed is a plane including the view-line vector V and the normal vector N computed in the step SA1. When this incident plane is projected onto an image plane as shown in FIG. 5, the direction of the incident plane can be expressed by an angle φ as represented in FIG. 6. Herein, $0 \leq \phi < \pi$ is held because only the direction is taken into consideration with no orientation taken into consideration. The above processing on each pixel in which specular reflection is present attains a two-dimensional distribution of the angles φ which represent the directions of the incident planes, as shown in FIG. 7.

Figure 8:
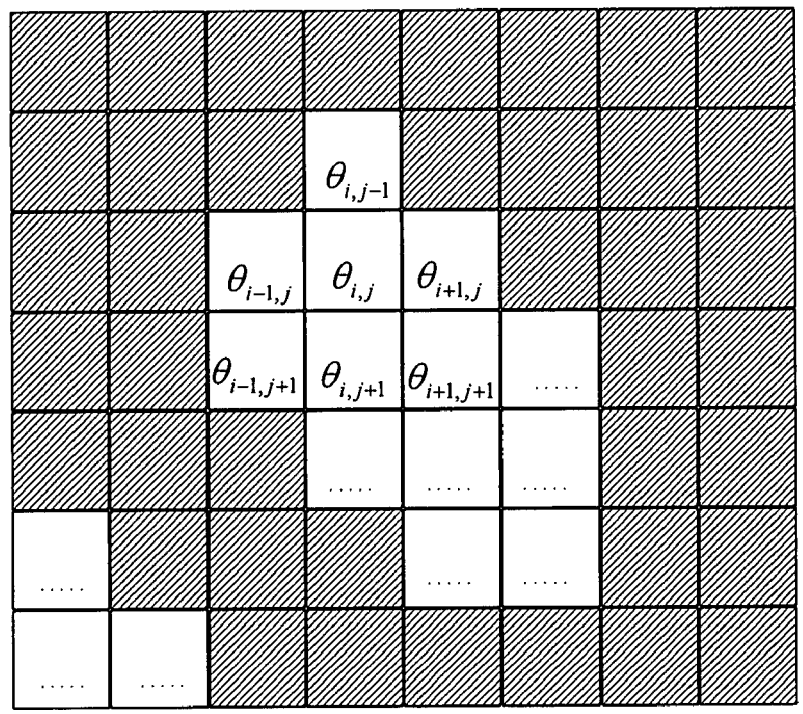
FIG. 8 is an illustration showing a two-dimensional distribution of incident angles.

Subsequently, in the incident angle computation section 108, an incident angle when specular reflection on the subject is observed by the camera is specified in each pixel in which the specular reflection is present (SA3). The incident angle θ is computed with the use of Expression 10 from the normal vector N computed in the step SA1 and the view-line vector V computed in the step SA2. Any incident angles satisfy $0 \leq \theta < \pi/2$. The above processing on each pixel in which specular reflection is present attains a two-dimensional distribution of the incident angles θ as shown in FIG. 8.

$$\theta = \cos^{-1}(N, V) \qquad \text{Expression 10}$$

Thereafter, in the classifying section 109, pixels similar to each other in both incident plane and incident angle are clustered to form at least one pixel set (SA4). Though any arbitrary method may be employed as the clustering, k-mean algorithm is employed herein. First, C cluster centers ($\phi_{c0}$, $\theta_{c0}$) are arranged as initial clusters equally in a two-dimensional space of $\phi$–$\theta$ (c=0, ..., C–1). The number C of clusters is determined in advance in a preliminary experiment. Suppose that the number of pixels in which specular reflection is present is K, the cluster number to which the k-th pixel having an incident plane direction $\phi_k$ and the incident angle $\theta_k$ belongs is $c_{kj}$ (k=0, ..., K–1) that satisfies Expression 11.

$$c_{kj} = \arg\min_c (d(\phi_{cj} - \phi_k) + \lambda \cdot d(\theta_{cj} - \theta_k)) \qquad \text{Expression 11}$$

Figure 9:
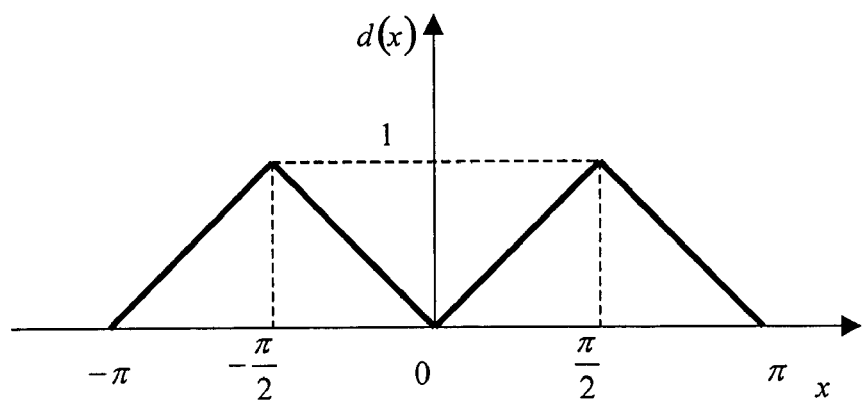
FIG. 9 is a graph showing a function that determines a distance scale at clustering in Embodiment 1 of the present invention.

Herein, j indicates the number of times of clustering, wherein j=0 in the initial time. ($\phi_{cj}$, $\theta_{cj}$) indicates the c-th cluster center in j-th clustering. λ indicates a parameter that determines the strength of influence of a distance relating to the incident plane and a distance relating to the incident angle, wherein λ=1. The function d(x) is a function having a local maximum value when x=±π/2 and a local minimum value of 0 when x=0 and x=±π, as shown in FIG. 9. After all the K pixels are made to belong to any of the C clusters, the cluster centers are updated (and j is incremented at the same time), and then, the clustering is repeated. When the migration lengths of all the cluster centers become smaller than a predetermined length threshold value, the clustering is terminated. Alternatively, the clustering may be terminated when the number j of times of clustering reaches a predetermined number of times.

Figure 10:
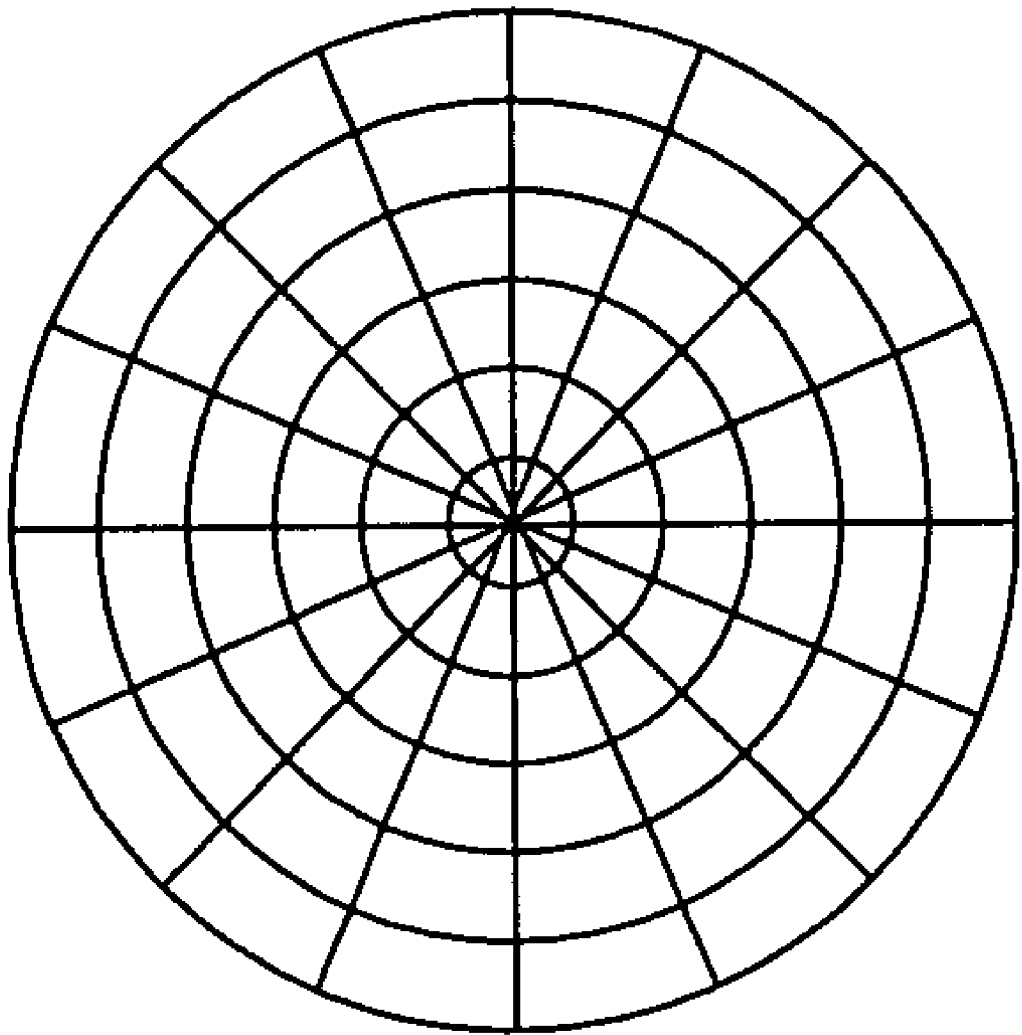
FIG. 10 is an illustration showing a result of clustering in the case where a subject is a solid sphere.

In the processing until now, pixels similar to each other in both incident plane and incident angle out of the pixels in which specular reflection is present are clustered in the same set. In the case where the subject is a solid sphere as shown in FIG. 30 and specular reflection is caused on the entire face of the sphere, the result of clustering is as shown in FIG. 10. In the case where the subject does not have a simple shape as that of a solid sphere, pixels similar to each other in both incident plane and incident angle may be classified into the same cluster even if they are far away from each other.

Next, in the reflection component separation section 110, reflection component separation is performed on each set of pixels included in the same cluster (SA5). Since the pixels included in the same cluster have substantially the same incident planes and incident angles, the method of Patent Document 2 can be employed. The method of Patent Document 2 utilizes singular value decomposition, but may utilize any general method of independent component analysis.

In this way, reflection component separation on the assumption of probabilistic independence after clustering pixels to set of pixels similar to each other in both incident plane and incident angle achieves reflection component separation under a condition of a light source other than parallel light.

Reflection component separation enables the present invention to be applicable as a preliminary processing of various kinds of image processing algorithms utilizing diffuse reflection. As well, the present invention can be used as a first step of modeling in the fields of CV (Computer Vision) and CG (Computer Graphics) in which the reflection characteristic of an object is modeled on a computer and the appearance thereof is rendered accurately.

Particularly, iris authentication is one of image processing/ recognition applications for identifying an individual with the use of diffuse reflected light from an iris as an input. In inputting the iris image, there arises one problem that specular reflection of illumination caused on a cornea overlaps with an iris region in a shot image. The surface of the cornea has a curvature to some extent, and an ambient wide-ranged light source is reflected therein. Therefore, it is difficult to prevent the reflection by adjusting the position of the illumination. Wherein, the present invention can be applied to component separation of specular reflection caused on a cornea on the grounds that:

1) The surface of a cornea is covered with a film of tear and has characteristics of both of being uniform in refractive index and being optically smooth locally;

2) Human corneas of individuals are substantially the same in shape and size, and therefore a geometric model can be prepared in advance easily.

3) Specular reflection at a cornea is caused by distribution of an ambient light source while diffuse reflection at an iris is caused by reflectance of the iris itself, and therefore, probabilistic independence between them can be assumed.

It is noted that though countermeasures of specular reflection in iris authentication are disclosed in Japanese Patent Application Laid Open Publication No. 9-212644A, Japanese Patent Application Laid Open Publication No. 10-162146A, Japanese Patent Application Laid Open Publication No. 11-203478A, and the like, these methods are principally directed to illumination (near-infrared light LEDs are used usually) provided in an iris shooting apparatus. Because the sunlight contains various near-infrared components, and many objects illuminated by the sunlight are reflected in the surface of the cornea as light sources from almost all directions, the conventional methods are difficult to be applied to outdoor iris authentication. In contrast, the present invention is applicable to such outdoor iris authentication.

In the case where a part of a subject is uniform in refractive index and optically smooth as in the eye (cornea) region in a face image, a region uniform in refractive index and optically smooth is specified in a preliminary processing, and then, the present invention is applied to the specified region. For example, as a method for extracting the eye region from a face image, a known technique employed in iris authentication or face authentication may be utilized.

Specifically, a plurality of images of a subject are shot under an arbitrary illumination condition by a camera through a polarizing element operable to set principal axes different from each other in direction, and a region uniform in refractive index and optically smooth in a local region is specified from the shot images. Then, the processing thereafter is performed on the specified region. For example, in the case where a subject is a human face, the eye region is specified as the region uniform in refractive index and optically smooth in a local region.

In face image authentication, in order to achieve robust authentication with respect to fitting/unfitting of eyeglasses, an image of a face without eyeglasses has been generated artificially by specifying and removing an eyeglass frame region on the basis of color information and geometric information and interpolating the removed region with the use of color information in the vicinity of the removed region. In this method, though the eyeglass frame region can be removed, the ambient image reflected in the eyeglass lens region, of which color and shape are indefinite, cannot be specified and removed and serves as noise in the artificially generated face image, thereby lowering the accuracy of face authentication. With this problem taken into consideration, when the lens region is further specified from the specified eyeglass frame region and specular reflection component is remove by applying the present invention to the lens region, the accuracy of face authentication increases. The lens of the eyeglasses is supposed to satisfy the conditions of being optically smooth in a local region and uniform in refractive index, and therefore, the present invention can be applied thereto.

Figure 11:
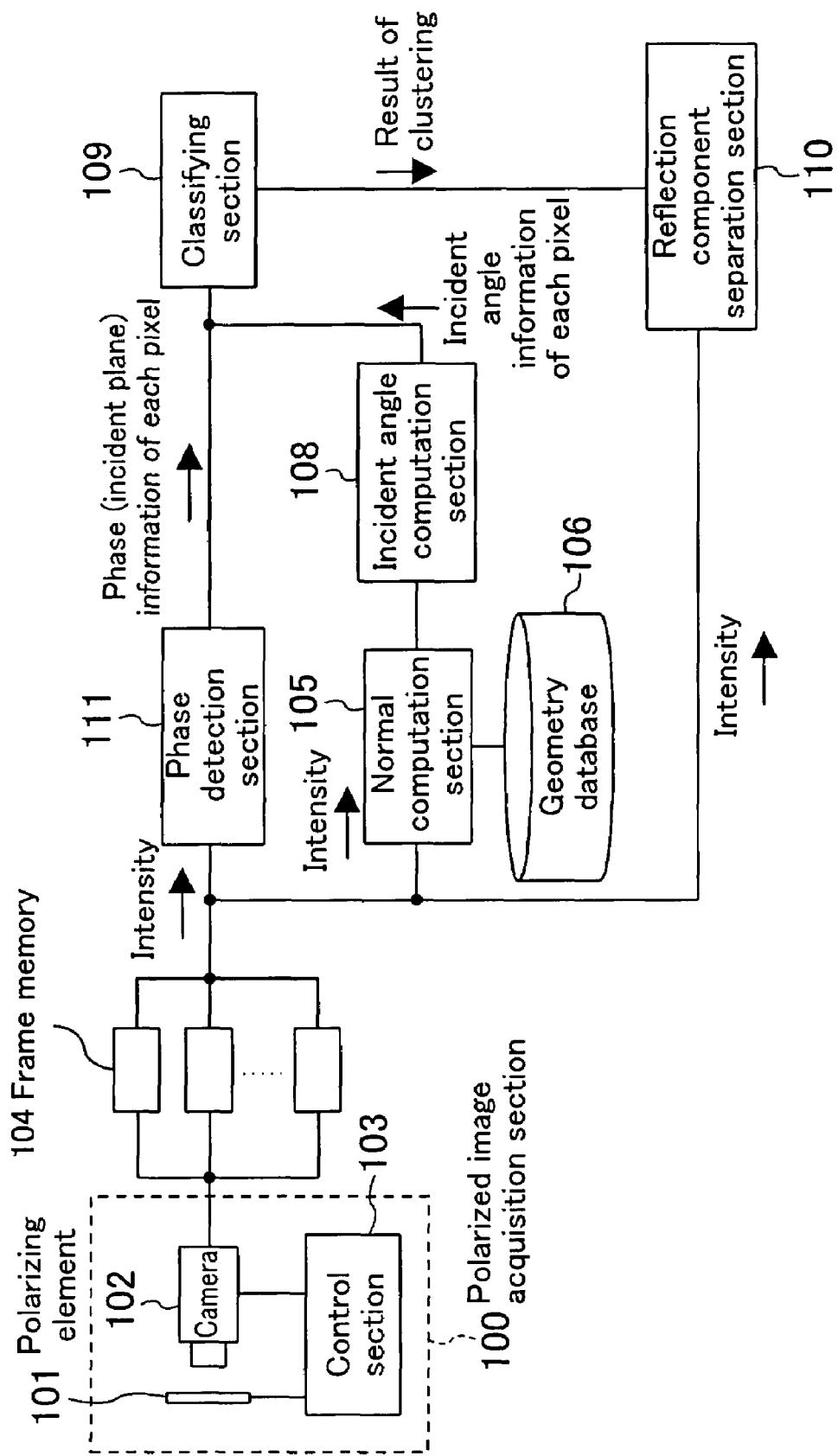
FIG. 11 is a block diagram showing a configuration example of an image processor according to a modified example of Embodiment 1 of the present invention.
Figure 12:
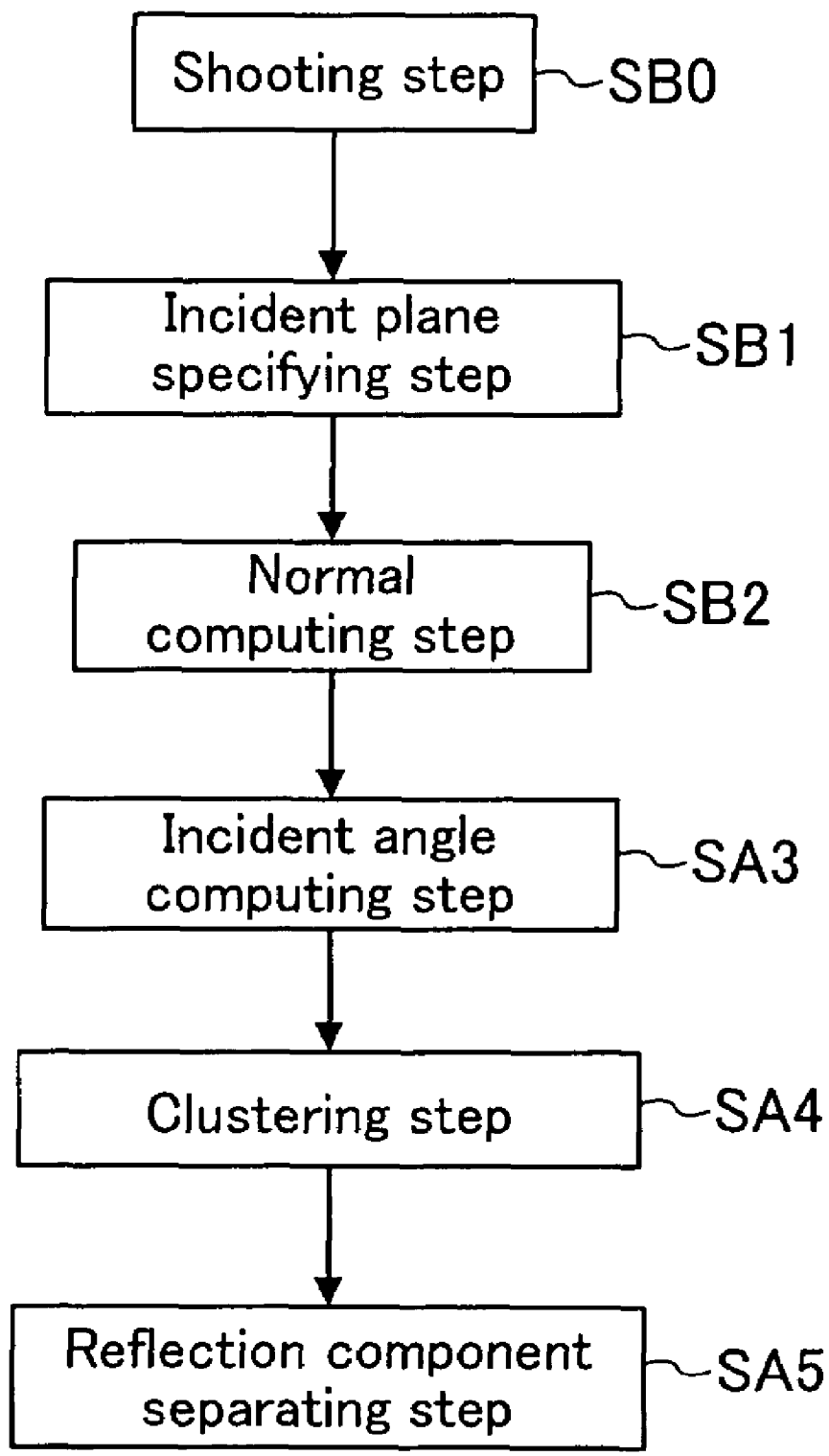
FIG. 12 is a flowchart depicting an image processing method according to the modified example of Embodiment 1 of the present invention.

FIG. 11 is a block diagram showing a configuration of an image processor that executes an image processing method according to a modified example of Embodiment 1. This image processor includes a phase detection section 111 in place of the incident plane specifying section 107 in FIG. 1. FIG. 12 is used as a flowchart of an image processing method according to the modified example of Embodiment 1.

The image processing method and the image processor according to the modified example of Embodiment 1 will be described below with reference to the block diagram of FIG. 1 and the flowchart of FIG. 12.

Figure 13:
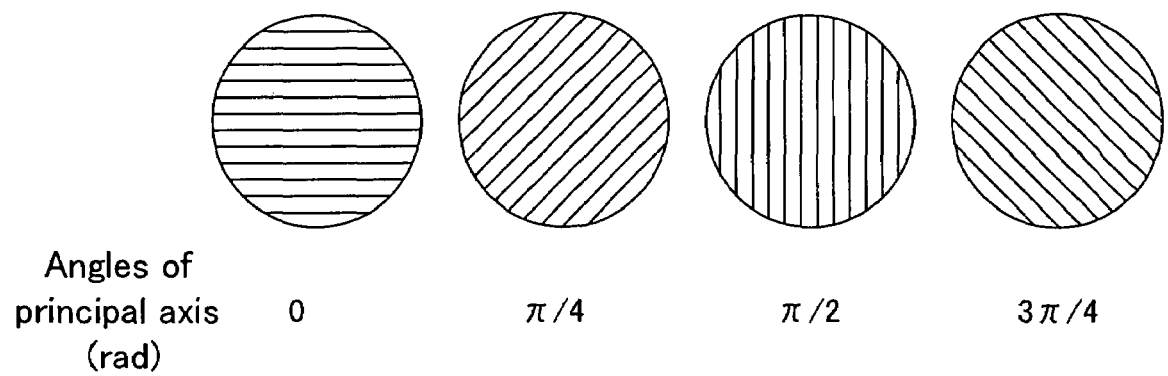
FIG. 13 is an illustration showing directions of the principal axis of a polarizing filter according to the modified example of Embodiment 1 of the present invention.

First, images of a subject are shot in the polarized image acquisition section 100 (SB0). The control section 103 changes the angle of the direction of the principal axis of the polarizing element 101 to F angles (F=4 in the present embodiment) and controls a shooting timing of the camera 102 so that the camera 102 shoots images with the direction of the principal axis changed to each angle. The obtained F images are stored in the frame memory 104 together with angle information on the set directions of the principal axis. In the present embodiment, a linear polarizing filter, which is used as the polarizing element 101, is rotated by a motor or the like to change the angle of the principal axis. The angle of the principal axis is changed to four angles, namely, 0, π/4, π/2, 3π/4(rad) as in shown FIG. 13.

Figure 14:
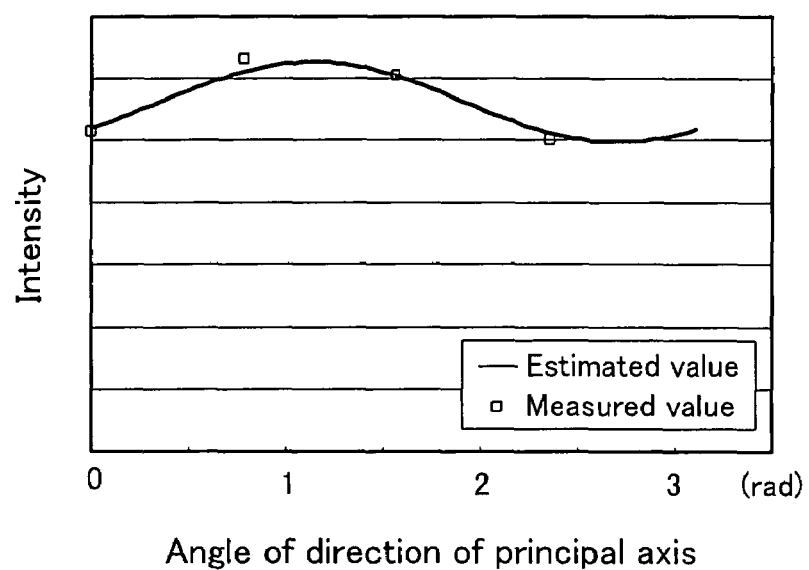
FIG. 14 is a graph showing a result obtained by fitting a sine function to intensity when a region on a subject including specular reflection is observed with the direction of the principal axis of a polarizing filter changed.

Next, in the phase detection section 111, an incident plane is specified in each pixel of the shot images (SB1). A phase of intensity variation in each pixel point (coordinates) is detected from F (=4) images stored in the frame memory 104. FIG. 14 shows a result of fitting of four intensities at a given pixel point observed with the polarizing filter rotated to a sine function. Hollow square plots in FIG. 4 indicate measured intensity values ($z_i$; i=1, 2, 3, 4) when the principal axis of the polarizing filter is set to four angles of 0, π/4, π/2, 3π/4(rad). The solid line is formed by fitting the measured intensity value $z_i$ to the sine function in Expression 12.

$$f(A, B, \phi; \theta) = A \sin(2\theta + \phi) + B \quad \text{Expression 12}$$

Fitting to the sine function is computed with the use of a standard where square errors of the measured value $z_i$ and the function of Expression 12 are minimum. Namely, parameters A, B, and φ which minimize Expression 13 are obtained. Herein, F=4, $\theta_1$=0, $\theta_2$=π/4, $\theta_3$=π/2, and $\theta_4$=3π/4.

$$E(A, B, \phi) = \sum_{i=1}^{N} (f(A, B, \phi; \theta_i) - z_i)^2 \quad \text{Expression 13}$$

For minimizing Expression 13, Expression 14 is satisfied. As can be understood from Expression 12, Expression 14 is a non-linear simultaneous equation, and accordingly, Levenberg-Marquardt algorithm as one of non-linear optimization methods is employed. Levenberg-Marquardt algorithm is described in detail in "J. J. More: "The Levenberg-Marquardt Algorithm: Implementation and Theory," in G. A. Watosn (ed.), Lecture Notes in Mathematics 630, Springer-Verlag, Berlin, 1978, 105-116," and therefore, the description thereof is omitted here.

$$\frac{\partial E}{\partial A} = \frac{\partial E}{\partial B} = \frac{\partial E}{\partial \phi} = 0 \quad \text{Expression 14}$$

Figure 27:
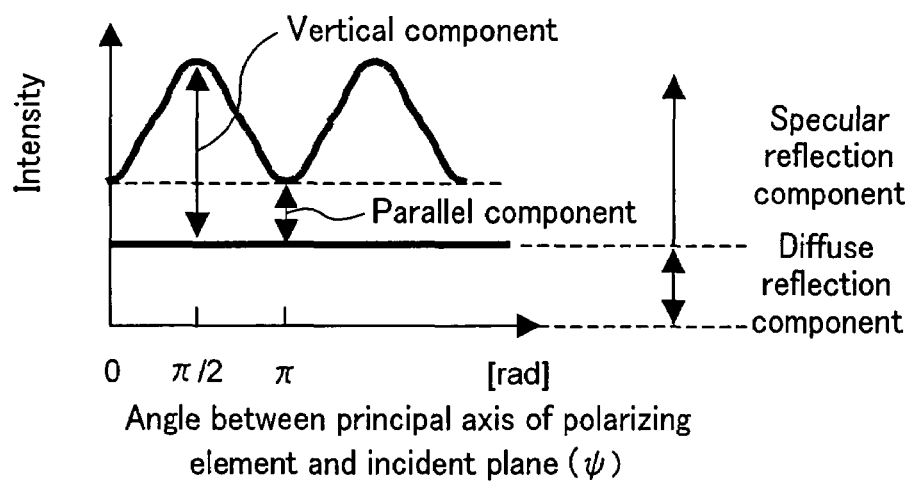
FIG. 27 is a graph showing a relationship between an angle of the principal axis of a polarizing filter and observed intensity.
Figure 28:
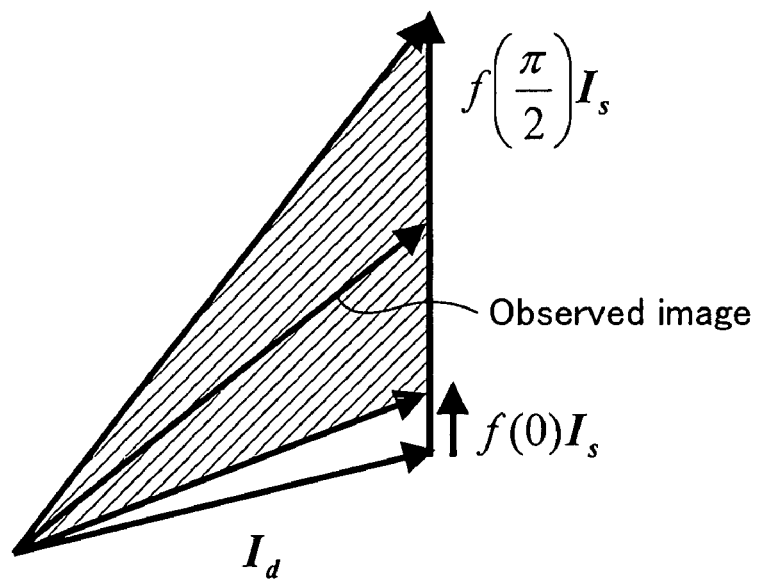
FIG. 28 is an illustration showing a variation range of an image vector when a subject of which refractive index is uniform is observed with the principal axis of a polarizing filter changed on the assumption of parallel light illumination and an orthographic cameral model.
Figure 29:
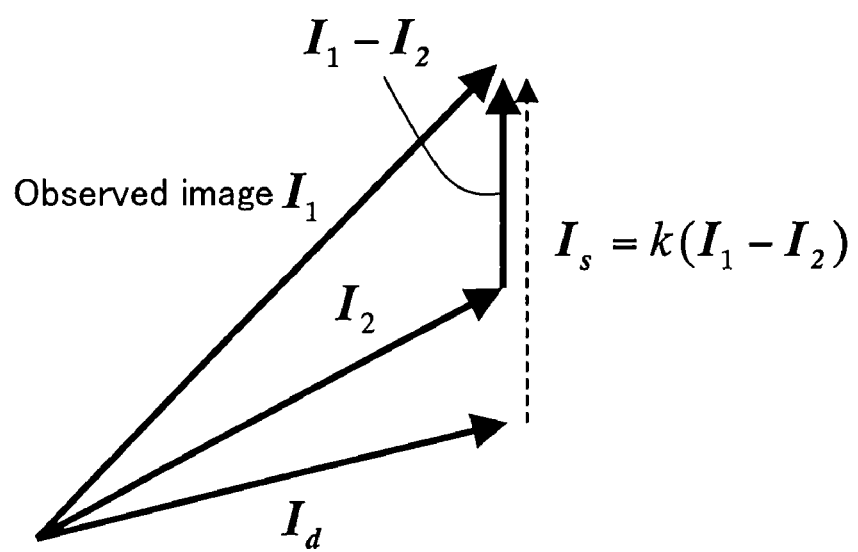
FIG. 29 is an illustration showing a relationship among two image vectors, a diffuse reflection image vector, and a specular reflection image vector when a subject of which refractive index is uniform is observed with two principal axes of a polarizing filter on the assumption of parallel light illumination and an orthographic camera model.
Figure 31A:
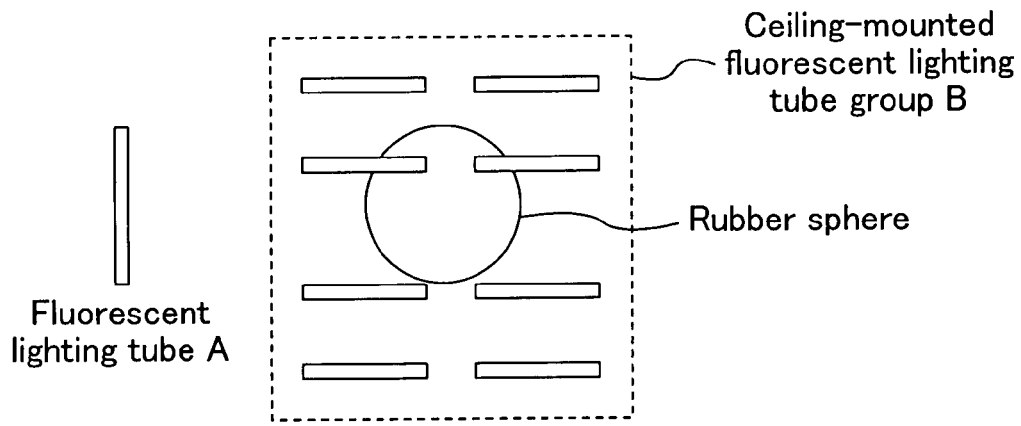
FIG. 31 is an illustration showing the illumination condition under which the image of FIG. 30 is shot.
Figure 31B:
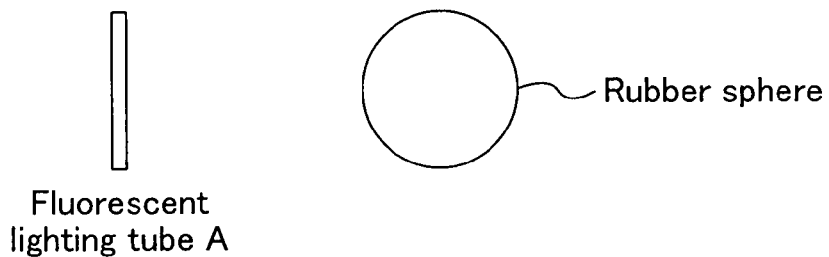
Figure 32:
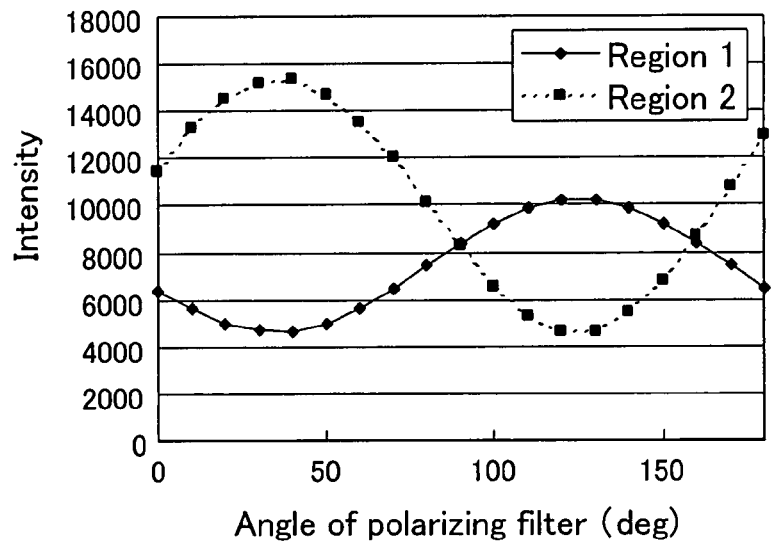
FIG. 32 is a graph showing a relationship between an angle of a polarizing filter and observed intensity in specular reflection regions of the subject in FIG. 30.
Figure 33:
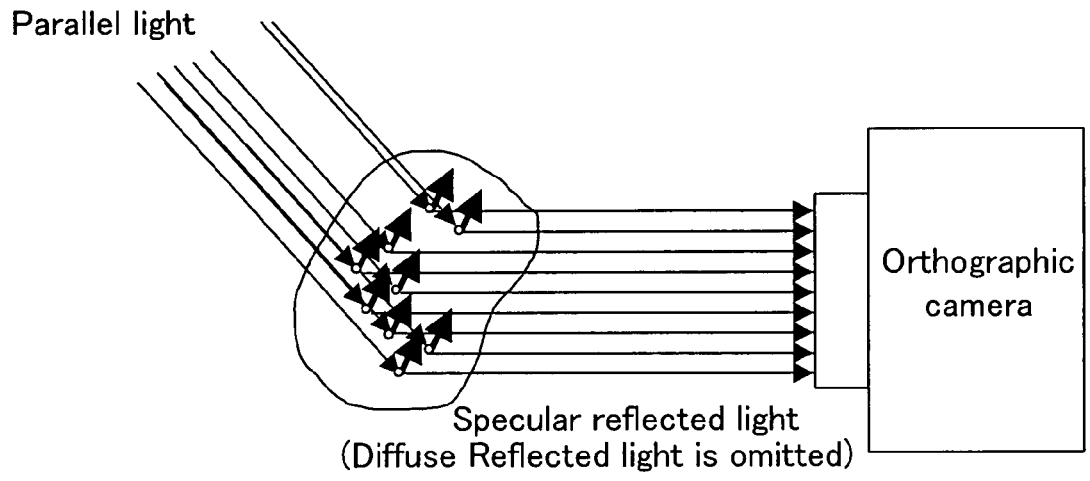
FIG. 33 is an illustration showing a condition that the method of Patent Document 2 premises.
Figure 34:
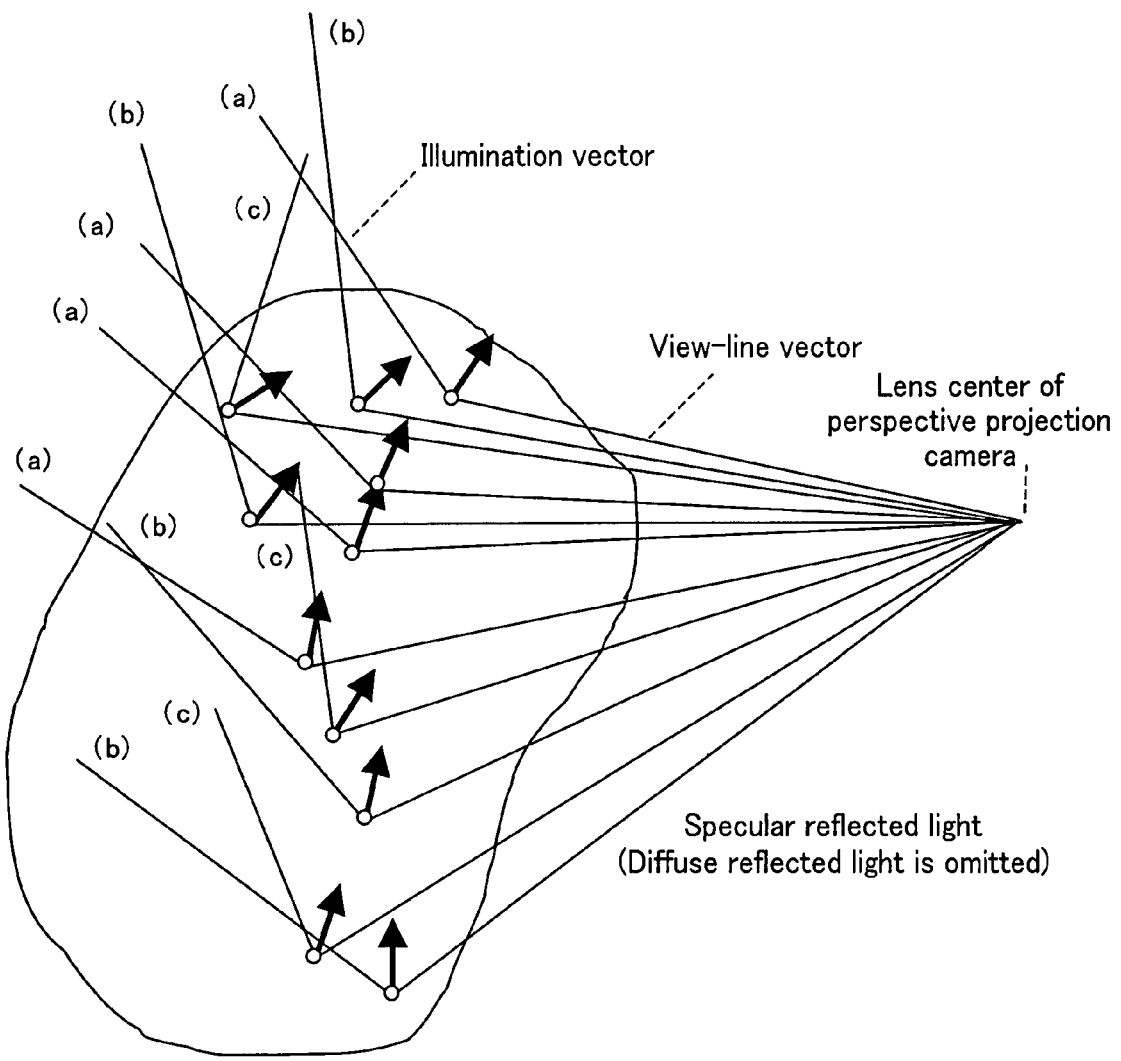
FIG. 34 is an illustration showing a state in which pixels equal to each other in incident angle are clustered in the present invention.

As described with reference to FIG. 27, in the case where specular reflection is observed by a camera, the intensity observed with the principal axis of the polarizing element set before the camera rotated varies in a sine function. Accordingly, a direction in which the incident plane is projected in an image plane can be specified from the relationship (a phase φ in Expression 12) between the angle of the principal axis of the polarizing element and the intensity variation in the sine function. FIG. 5 shows the case where specular reflection is observed at a given pixel point. Projection of the specified incident plane onto an image plane attains information on the direction of the incident plane. The phase φ (0≦φ<π) can be used for expressing the direction thereof. As to a pixel of which intensity variation cannot be observed, namely, of which intensity is substantially constant, it is judged that specular reflection is not present in the pixel, and the phase φ information is not used in the processing thereafter. Whether or not the intensity is substantially constant can be judged according to whether or not amplitude A in Expression 12 is smaller than a predetermined threshold value Th, as in Expression 15.

$$A < Th \quad \text{Expression 15}$$

Subsequently, a normal direction on the subject is computed in the normal computation section 105 (SB2). The present image processor is supposed to have knowledge about the three-dimensional geometry of the subject to be shot. The normal computation section 105 obtains three-dimensional geometry data of the subject from the geometry database 106 and estimates the three-dimensional posture and the three-dimensional position of the subject in a camera coordinate system from the appearance of the subject in the shot images. Estimation of the three-dimensional posture and the three-dimensional position thereof leads to computation of a unit normal vector N=($n_x$, $n_y$, $n_z$) at an arbitrary point on the subject in the camera coordinate system. The above processing is repeated for each pixel in which specular reflection is present in the shot images to compute the normal vector N of the subject.

In the present embodiment, in addition to the appearance of the subject, the two-dimensional distribution of the directions (FIG. 5) obtained by projecting onto an image plane the incident planes, which are planes including the surface normal vectors of the subject and the view-line vector, is utilized for estimating the three-dimensional posture and the three-dimensional position of the subject. As shown in FIG. 15, consider the case where the two-dimensional distribution A of directions obtained by projecting the incident planes measured using the polarizing element in the step SB1 onto an image plane can be obtained. When the three-dimensional posture and the three-dimensional position thereof in the camera coordinate system is assumed with the use of the three-dimensional geometry data of the subject, the incident planes can be defined even with the indefinite illumination direction and a two-dimensional distribution B of the directions obtained by projecting the defined incident planes onto an image plane can be obtained. The three-dimensional posture and the three-dimensional position can be expressed by a six-dimensional vector x.

The three-dimensional posture and the three-dimensional position x in the camera coordinate system is updated so that the two-dimensional distribution A and the two-dimensional distribution B agree with each other. Determination of the three-dimensional posture and the three-dimensional position x leads to computation of the normal line on the subject.

Description will be given with respect to FIG. 16 to an aspect in computing an agreement degree between the two-dimensional distributions A and B of directions obtained by projecting the incident planes onto an image plane. As to a direction $\phi$ at coordinates (i, j), when there are obtained A, which is obtained by measurement through the polarizing element, and B, which is obtained on the assumption of the vector x of the three-dimensional posture and the three-dimensional position, the similarity $s_{i,j}$ between the corresponding directions $\phi$ at the coordinates (i, j) can be expressed by Expression 16.

$$s_{i,j}(x) = |\cos(\phi_{A_{i,j}} - \phi_{B_{i,j}}(x))| \qquad \text{Expression 16}$$

When using Expression 16, $0 \leq s_{i,j} \leq 1$ is held, The similarity $s_{i,j}$ is 1 when an angle formed between the two directions $\phi_A$ and $\phi_B$ is 0 degree while being 0 when the directions are intersected at a right angle with each other.

The agreement degree between the two-dimensional distributions A, B can be expressed by Expression 17 using Expression 16. Wherein, $\Omega$ is an aggregation of coordinates (i, j) in which specular reflection is present in measured images.

$$S(x) = \sum_{(i,j)\in\Omega} s_{i,j}(x) = \sum_{(i,j)\in\Omega} |\cos(\phi_{A_{i,j}} - \phi_{B_{i,j}}(x))| \qquad \text{Expression 17}$$

After the three-dimensional posture and the three-dimensional position x which maximizes Expression 17 are obtained, the normal line on the subject is computed.

When the normal line on the subject can be computed, the processing thereafter can be performed similarly to that in Embodiment 1.

Though the number F of images shot through the polarizing element operable to set principal axes different from each other in direction is four herein, the number F is any number equal to or larger than three according to a sampling theorem.

In the present embodiment, with more information usable for estimating the three-dimensional posture and the three-dimensional position than that in Embodiment 1, estimation thereof is facilitated.

(Estimation of Refractive Index)

The present invention can separate the specular reflection component and the diffuse reflection component even in a condition where illumination made incident in various directions causes specular reflection on a subject having various normal lines. In other words, specular reflection caused at various incident angles can be separated. With this separation result, a refractive index as one of physical characteristics of a subject can be estimated on the assumption that the refractive index of the subject is substantially uniform. Since the refractive index can be estimated on a pixel basis, computation of mean values and intermediate values of values estimated on the pixel basis enables further probable estimation.

Estimation of the refractive index leads to non-contact estimation of a kind of a material. Further, since the refractive index determines a Fresnel coefficient that determines a specular reflection characteristic of a subject, the estimation can contribute to CV (computer Vision) and CG (Computer Graphics) in which the reflection characteristic of an object are modeled onto a computer and the appearance thereof is rendered accurately.

Figure 17:
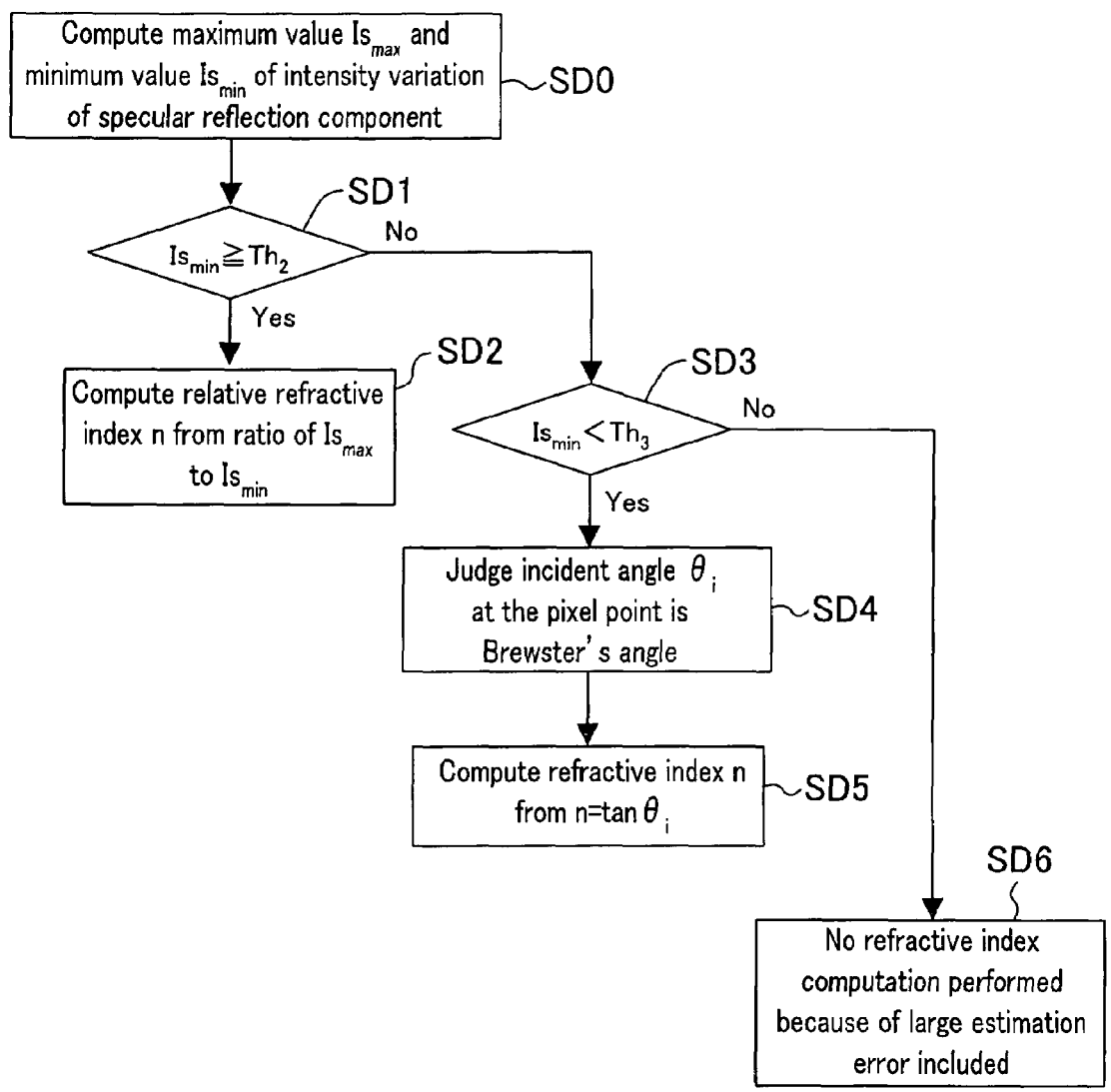
FIG. 17 is a flowchart depicting a refractive index estimating method in the present embodiment.

A refractive index estimation method will be described below with reference to the flowchart of FIG. 17. It is supposed that the specular reflection component and the diffuse reflection component have been separated by performing the above described reflection component separation according to the present invention.

Figure 18:
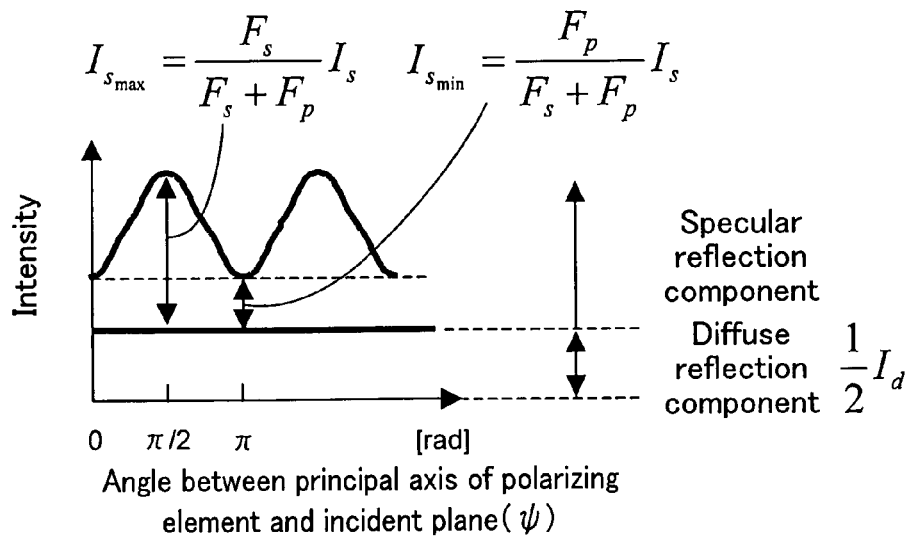
FIG. 18 is a graph showing a relationship between an angle of the principal axis of a polarizing filter and intensity of specular reflection, which is utilized in refractive index estimation.

It has been described with reference to FIG. 27 that when a pixel including specular reflection is observed with the direction of principal axis of the polarizing element set before the camera changed, the intensity varies in a sine function with respect to the angle of the direction of the principal axis. As can be understood from FIG. 18, the intensity is maximum when the principal axis of the polarizing element is intersected at a right angle with the incident plane. Suppose that the diffuse reflection component and the specular reflection component at an intensity before the light passes through the polarizing element are $I_d$ and $I_s$, respectively, the intensity $I_{max}$ observed after the light passes through the polarizing element is expressed by Expression 18. Wherein, $I_d$ and $I_s$ used herein are scalars different from the vectors $I_d$ and $I_s$ used in Expression 7.

$$\frac{1}{2}I_d + \frac{F_s}{F_s + F_p}I_s = I_{max} \qquad \text{Expression 18}$$

Wherein, $F_p$ and $F_s$ are Fresnel coefficients about reflected energy expressed by Expression 3 and Expression 4, respectively. As well, the intensity is minimum when the principal axis of the polarizing element is parallel to the incident plane, and the intensity $I_{min}$ observed after the light passes through the polarizing element is expressed by Expression 19.

$$\frac{1}{2}I_d + \frac{F_p}{F_s + F_p}I_s = I_{min} \qquad \text{Expression 19}$$

It has been already described that when the number F of images shot through the polarizing element operable to set principal axes different from each other in direction is three or larger, fitting of intensity variation of a target pixel to a sine function as shown in FIG. 14 obtains the maximum value $I_{max}$ and the minimum value $I_{min}$ of the observed intensity variation. After using the reflection component separation method of the present invention, the maximum value $Is_{max}$ and the minimum value $Is_{min}$ of the specular reflection component $I_s$, which are expressed by Expression 20 and Expression 21, respectively, are obtained.

$$\frac{F_s}{F_s + F_p} I_s = I_{s_{max}} \quad \text{Expression 20}$$

$$\frac{F_p}{F_s + F_p} I_s = I_{s_{min}} \quad \text{Expression 21}$$

Figure 19A:
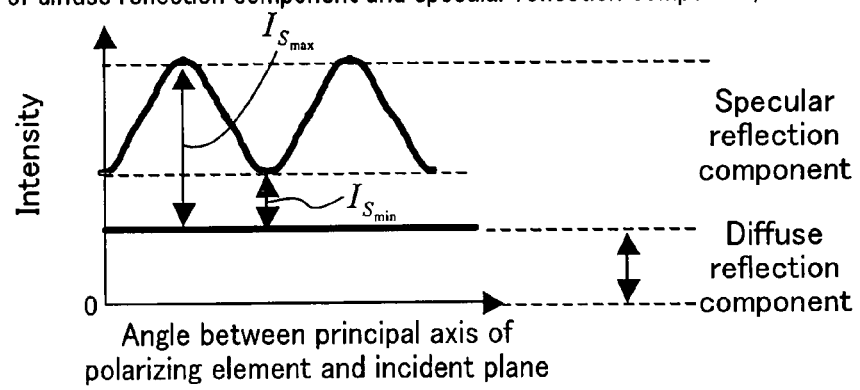
FIG. 19A and FIG. 19B presents graph examples showing intensity variations with respect to an angle formed between the principal axis of a polarizing element and an incident plane before reflection component separation and after reflection component separation (specular reflection component only), respectively.
Figure 19B:
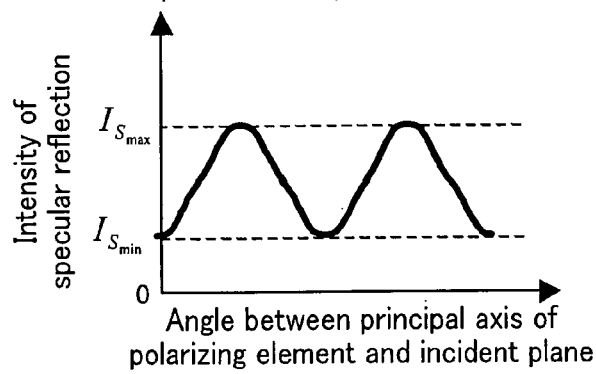

FIG. 19A and FIG. 19B present graph examples showing intensity variations with respect to the angle formed between the principal axis of the polarizing element and the incident plane before reflection component separation and after reflection component separation (only specular reflection component), respectively.

Thereafter, whether or not the minimum value $Is_{min}$ is equal to or larger than a predetermined threshold value $Th_2$ is judged (SD1). When it is equal to or larger than the threshold value $Th_2$, the following step SD2 is executed.

Calculation of a ratio of the maximum value $Is_{max}$ to the minimum value $Is_{min}$ of the specular reflection component $I_s$ reaches Expression 22.

$$\frac{i_{s_{max}}}{i_{s_{min}}} = \frac{F_s}{F_p} = \frac{\cos^2(\theta_i' - \theta_i'')}{\cos^2(\theta_i' + \theta_i'')} \quad \text{Expression 22}$$

With Snell's law in Expression 5 utilized, the ratio of the maximum value to the minimum value of the specular reflection component can be expressed by a local incident angle $\theta'_i$ made incident to a micro facet and a relative refractive index n. When the subject is optically smooth, the local incident angle $\theta'_i$ is equal to the incident angle $\theta_i$ about the macro normal line. The incident angle $\theta_i$ of each pixel has been already computed, and accordingly, resolving of Expression 23 in each pixel point in which specular reflection is present leads to computation of the relative refractive index n of each pixel point.

$$\frac{i_{s_{max}}}{i_{s_{min}}} = \frac{F_s}{F_p} = \frac{\cos^2\left(\theta_i - \sin^{-1}\left(\frac{1}{n}\sin\theta_i\right)\right)}{\cos^2\left(\theta_i + \sin^{-1}\left(\frac{1}{n}\sin\theta_i\right)\right)} \quad \text{Expression 23}$$

Wherein, the Fresnel coefficient $F_p$ approximates to zero when a pixel point has an incident angle approximating to the Brewster's angle, and accordingly, the minimum value $Is_{min}$ of the specular reflection component approximates to zero and the ratio of Expression 23 becomes very large to increase an estimation error of the relative refractive index n. Therefore, the above processing is not performed. In other words, when the minimum value $Is_{min}$ is smaller than the threshold value $Th_2$, which is a threshold value for judging whether or not $1/Is_{min}$ can be used in value calculation, the above processing is not performed.

Figure 20:
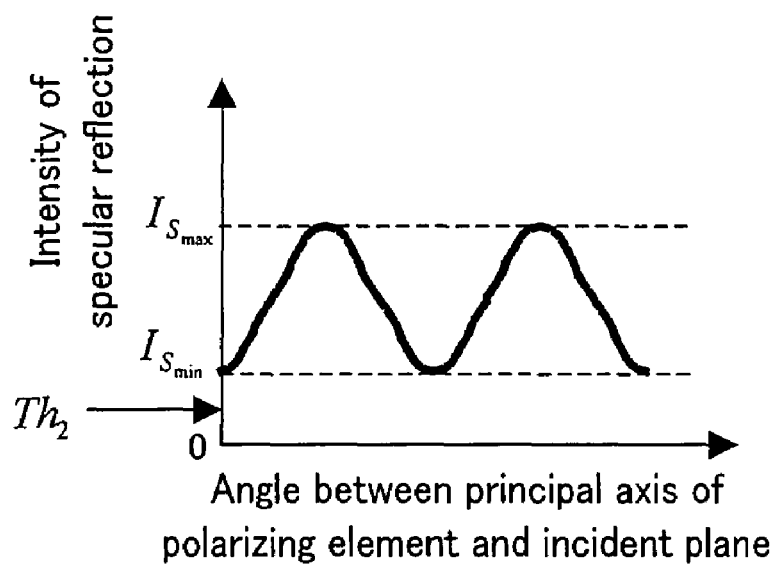
FIG. 20 is a graph example showing intensity variation with respect to an angle formed between the principal axis of a polarizing element and an incident plane when a minimum value $Is_{min}$ of the specular reflection component is equal to or larger than a threshold value $Th_2$.

FIG. 20 is a graph example showing intensity variation with respect to the angle formed between the principal axis of the polarizing element and the incident plane when the minimum value $Is_{min}$ of the specular reflection component is equal to or larger than the threshold value $Th_2$. In this example, in which the minimum value $Is_{min}$ of the specular reflection component is equal to or larger than the threshold value $Th_2$, the value of the ratio in Expression 23 can be calculated at a given accuracy.

When the minimum value $Is_{min}$ is smaller than the threshold value $Th_2$ in the step SD1, a step SD3 and the following steps are executed.

First, whether or not the minimum value $Is_{min}$ is smaller than a predetermined threshold value $Th_3$ is judged (SD3). The threshold value $Th_3$ satisfies the relationship of $Th_3 \leq Th_2$. Here, when $Th_3 < Th_2$, the minimum value $Is_{min}$ may be equal to or larger than the threshold value $Th_3$. When this is the case (No in the step SD3), the current target pixel point is judged to include a large calculation error in computation in the step SD2 and a step SD5 that will be described later, and therefore, the refractive index is not calculated (SD6). In the case where $Th_3 = Th_2$, when the minimum value is judged to be smaller than the threshold value $Th_2$ in the step SD1, the following step SD4 is executed in any case (the steps SD3 and SD6 are omitted).

When the minimum value $Is_{min}$ is smaller than the threshold value $Th_3$ in the step SD3, the incident angle of the current target pixel is judged to be a Brewster's angle (SD4). Namely, the threshold value $Th_3$ serves as a threshold value for judging whether or not the minimum value $Is_{min}$ can be regarded as 0 (zero).

Figure 21:
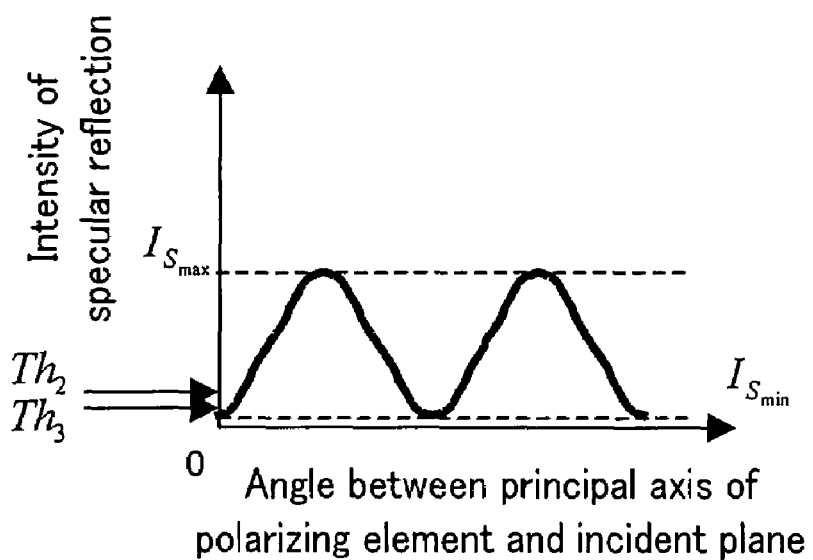
FIG. 21 show a graph example showing intensity variation with respect to an angle formed between the principal axis of a polarizing element and an incident plane when a minimum value $Is_{min}$ of the specular reflection component is smaller than a threshold value $Th_3$.

FIG. 21 is a graph example showing intensity variation with respect to the angle formed between the principal axis of the polarizing element and the incident plane when the minimum value $Is_{min}$ of the specular reflection component is smaller than the threshold value $Th_3$. In this example, in which the minimum value $Is_{min}$ of the specular reflection component is smaller than the threshold value $Th_3$, the incident angle of the current target pixel is judge to be a Brewster's angle.

Then, the relative refractive index n is computed from the already obtained incident angle $\theta_i$ of the current target pixel with the use of Expression 24 (SD5).

$$n = \tan \theta_i \quad \text{Expression 24}$$

When the medium 1 is air, the value of the relative refractive index directly serves as the refractive index of the medium 2 (the subject). In the present embodiment, the refractive indices are computed independently in a plurality of pixel points. On the assumption that the refractive index of the subject is substantially uniform, calculation of intermediate values or mean values of the plurality of computed refractive indices enables further robust estimation of the refractive index.

Embodiment 2

Figure 22:
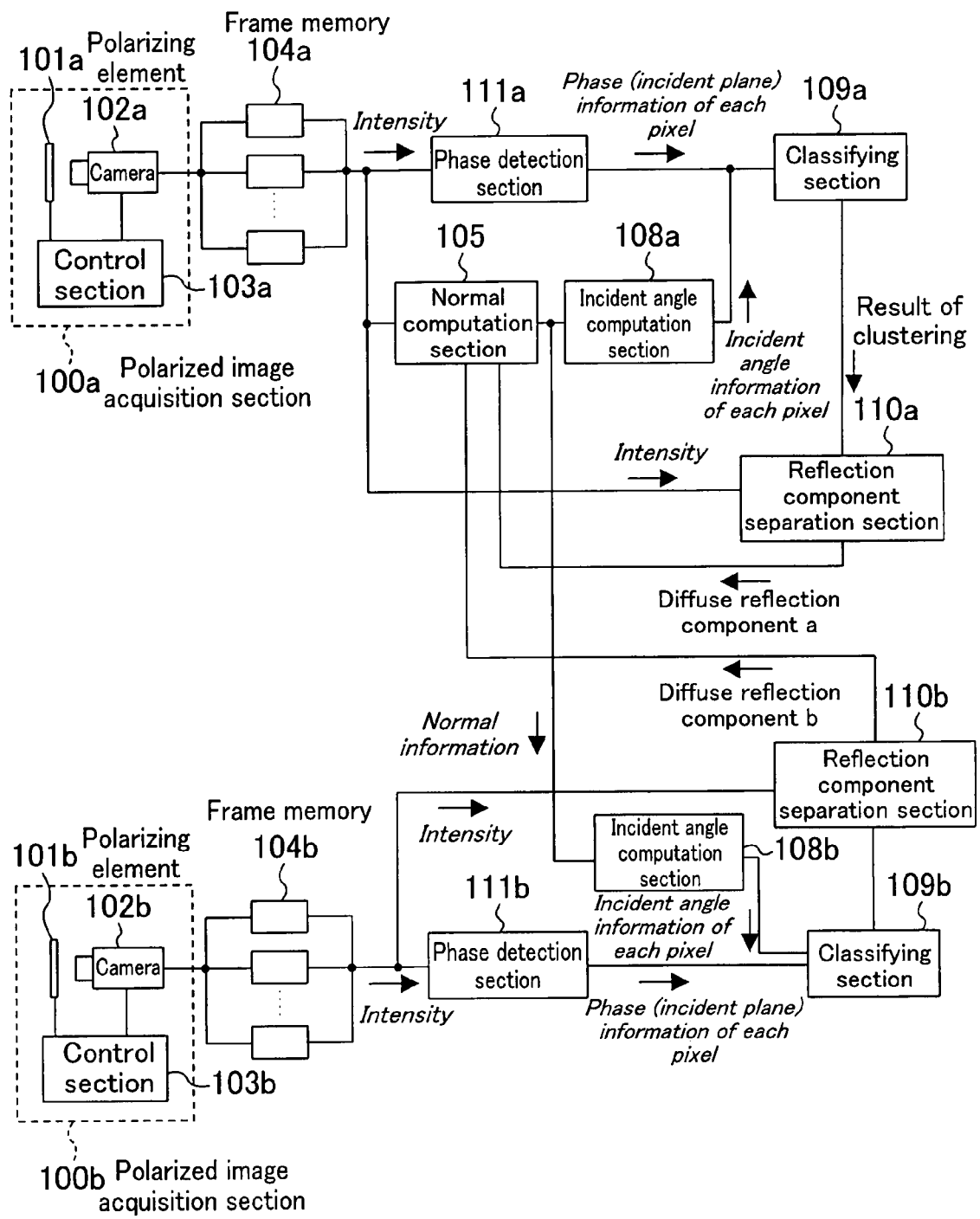
FIG. 22 is a block diagram showing a configuration example of an image processor according to Embodiment 2 of the present invention.
Figure 23:
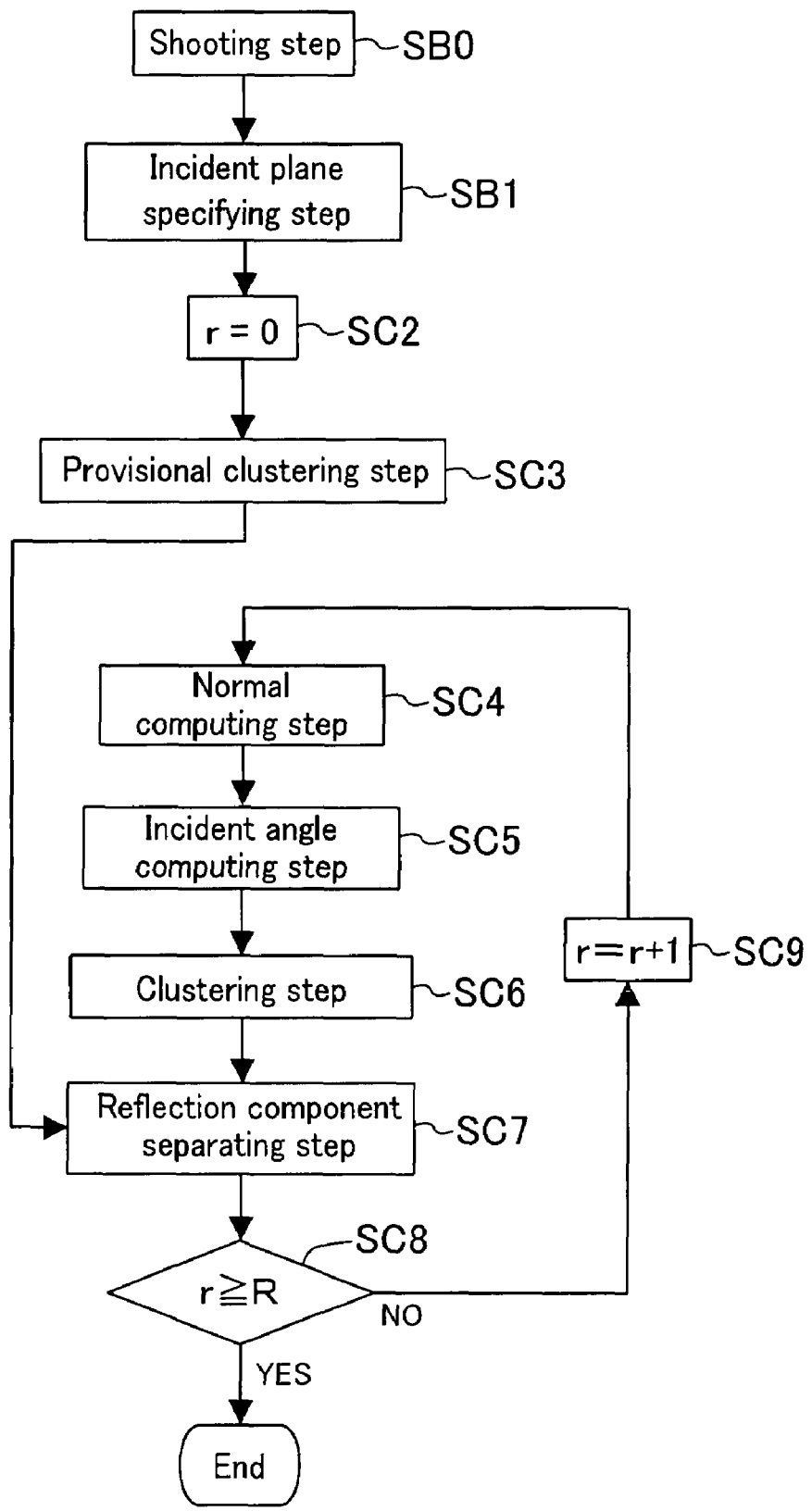
FIG. 23 is a flowchart depicting an image processing method according to Embodiment 2 of the present invention.

FIG. 22 is a block diagram showing a configuration of an image processor that executes an image processing method according to Embodiment 2. The image processor includes two polarized image acquisition sections 100, two polarizing elements 101, two cameras 102, two control sections 102, two frame memories 104, two incident angle computation sections 108, two phase detection sections 111, two classifying sections 109, and two reflection component separation section 110, which have been already described in Embodiment 1 and the modified example thereof. Subscripts a and b are affixed for distinguishing the pairs. Additionally, one normal computation section 105 is provided. As a flowchart of the image processing method according to Embodiment 2, FIG. 23 is used.

The image processing method and the image processor will be described below with reference to the block diagram of FIG. 22 and the flowchart of FIG. 23.

First, in each of the polarized image acquisition sections 100a, 100b, images of a subject are shot (SB0). The processing in each of them is the same as the step SB0 in the modified example of Embodiment 1. Namely, F (=4) images are shot in each of the polarized image acquisition sections 100a, 100b. Image sets shot by the polarized image acquisition sections 100a, 100b are called images sets A and B, respectively. For stereo measurement in a normal computing step SC4 thereafter, the two cameras 102a, 102b are subjected to camera calibration in advance.

Next, in the respective phase detection sections 111a, 111b, an incident plane is specified in each pixel of the respective shot image sets A, B (SB1). The processing of each of them is the same as the step SB1 in the modified example of Embodiment 1, as well.

Subsequently, the number r of repetitions of the counter is set to zero (SC2).

Then, in the respective classification sections 109a, 109b, pixels similar to each other in incident plane are clustered in the respective image sets A, B. Though only the processing thereafter performed on the image set A will be described, the processing performed on the image set B is the same.

Though any arbitrary method may be employed as the clustering, k-mean algorithm is employed herein. First, $C_1$ cluster centers $\phi_{c0}$ are arranged as initial clusters equally in a one-dimensional space extending in a phase $\phi$ (c=0, ..., $C_1$−1). The number $C_1$ of clusters is determined in advance in a preliminary experiment. Suppose that the number of pixels in which the specular reflection is present is K, the cluster number to which the k-th pixel having the phase (direction of incident plane) $\phi_k$ belongs is $c_{kj}$ (k=0, ..., K−1) that satisfies Expression 25.

$$c_{kj} = \underset{c}{\operatorname{argmin}}(d(\phi_{cj} - \phi_k)) \quad \text{Expression 25}$$

Herein, j indicates the number of times of clustering. Currently, j=0. $\phi_{cj}$ indicates the c-th cluster center in the j-th clustering. The function d(x) is a function having a local maximum value when x=±π/2 and a local minimum value of 0 when x=0 and x=±π. After all the K pixels are made to belong to any of the $C_1$ clusters, the cluster centers are updated (and j is incremented at the same time), and then, the clustering is repeated. When the migration lengths of all the cluster centers become smaller than a predetermined length threshold value, the clustering is terminated. Alternatively, the clustering may be terminated when the number j of times of clustering reaches a predetermined number of times.

At this stage, the pixels in which specular reflection is present are merely clustered to pixels similar to each other in direction of the incident plane, and therefore, the incident angles in the same cluster may not be similar to each other. Since the incident angle cannot be computed with the normal direction of the subject unknown, pixels of which coordinates on an image plane are close to each other are clustered as provisional clustering. All of the $C_1$ clusters are divided further into $C_2$ clusters. As a result, the pixels are divided into $C_1 \times C_2$. Detail description of the clustering is omitted.

The above processing is performed on the image set B, as well.

Next, in the respective reflection component separation sections 110a, 110b, reflection component separation is performed on each set of the pixels included in the same cluster in the respective image sets A, B (SC7). The pixels included in the same cluster have substantially the same incident planes. Further, since the pixels of which coordinates on the image plane are closed to each other are clustered, the pixels included in the same cluster are considered to have substantially the same incident angles. Hence, the method of Patent Document 2 can be employed as a reflection component separation method. The method of Patent Document 2 utilizes singular value decomposition, but may utilize any general independent composition analysis.

Figure 24:
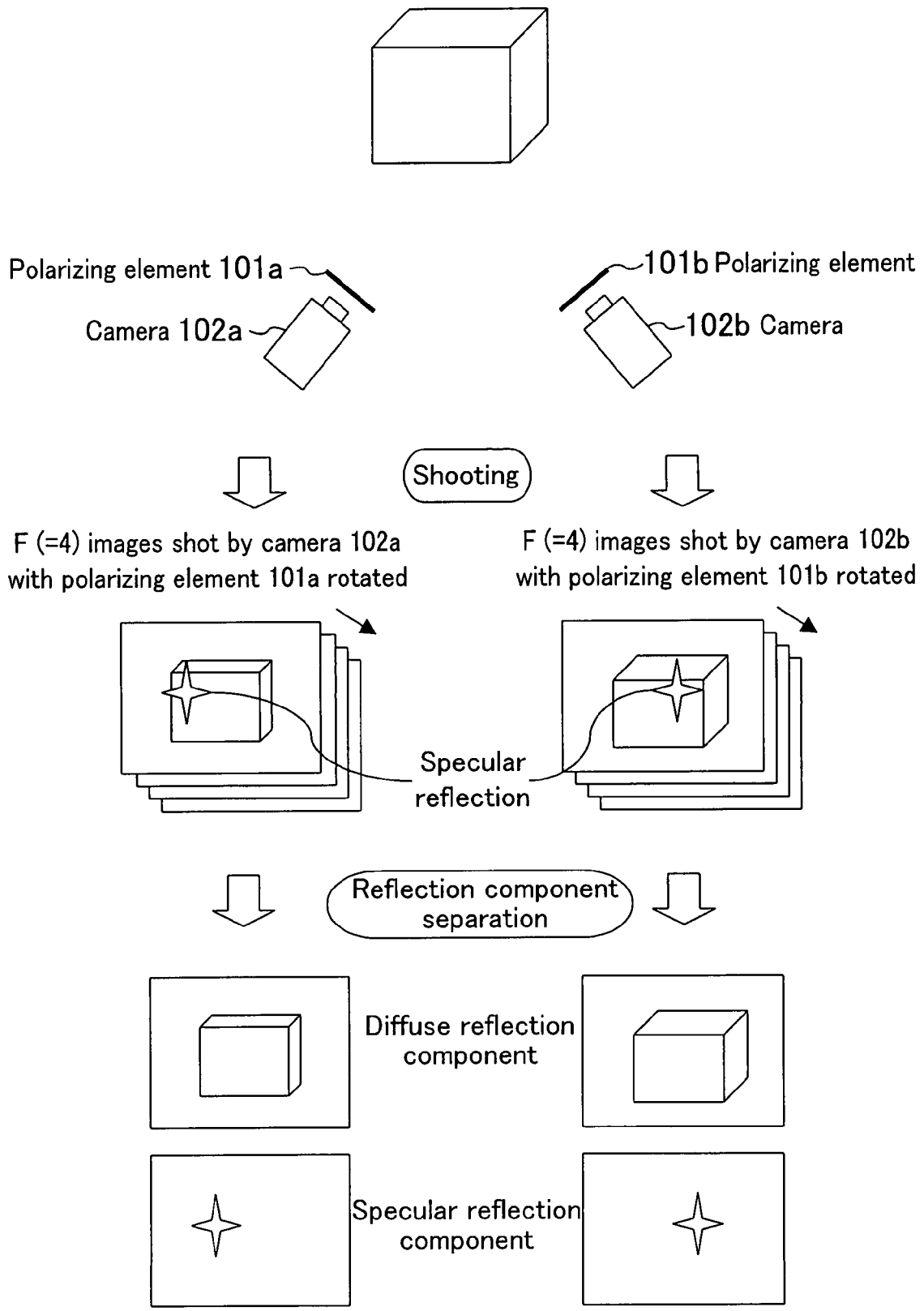
FIG. 24 is an illustration showing aspects up to reflection component separation in Embodiment 2 of the present invention.
Figure 26:
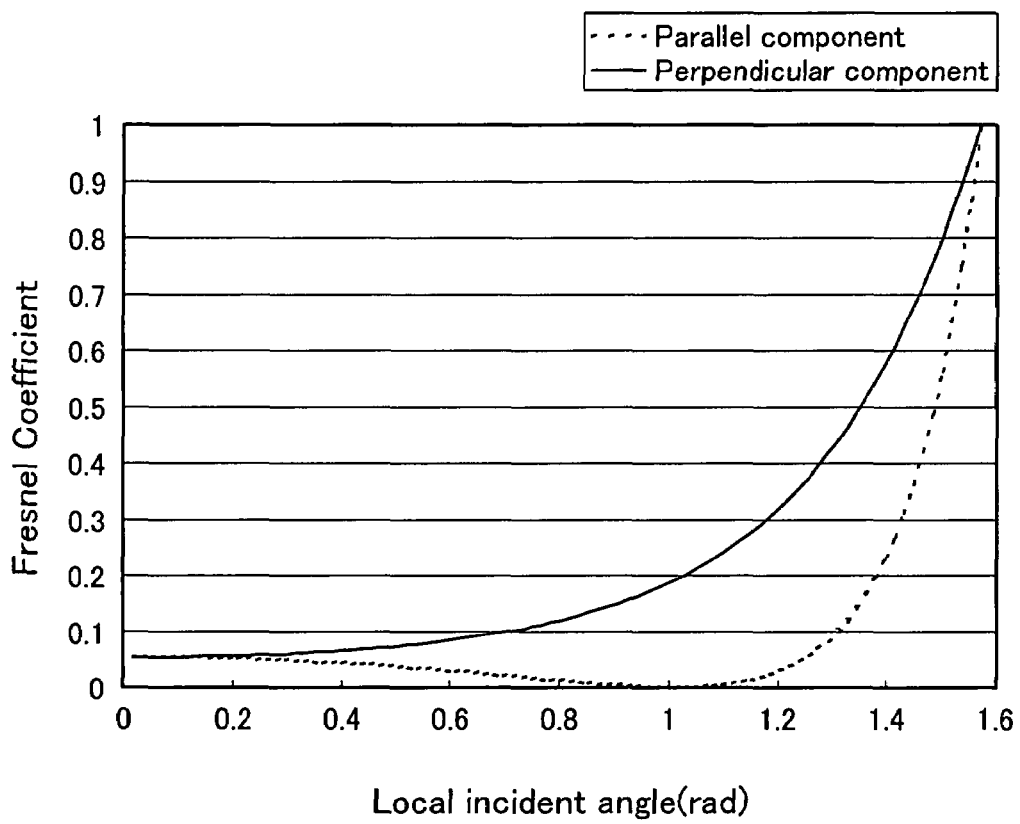
FIG. 26 is a graph showing Fresnel intensity reflectance when a relative refractive index is 1.6.

In this stage, the diffuse reflection component and the specular reflection component are separated from the two image sets A, B shot by the different two cameras 102a, 102b. FIG. 24 illustrates the scheme of the processing up to this time. Wherein, in the case where the subject has a normal line as its edge, the incident angles of the pixels included in the same cluster are different from each other, inviting lowering of the accuracy of reflection component separation. For taking this fact into consideration, in the present embodiment, the normal line is estimated from the separated diffuse reflection component, and the reflection component separation with the use of the thus obtained normal line (steps SC4 to SC7) is repeated at least one time.

Whether or not the number r of repetitions reaches an upper limit R is checked (SC8). When it exceeds the upper limit, the processing is terminated. Otherwise, the number r is incremented by one (SC9).

Subsequently, the normal direction on the subject is computed in the normal computation section 105 (SC4). Herein, stereo vision is performed with the use of two diffuse reflection images, which are separated from the respective image sets A, B shot by the respective cameras 102a, 102b, to obtain a range image, and then, the normal direction is computed. As the stereo vision, area-based stereo vision may be employed. As to stereo vision, various documents can be found, and a summary is disclosed in, for example, "Computer vision; Technical review and prospective vision," edited by Takashi Matsuyama, Yoshitoku Hisano, and Jun Imiya, Shin-gijutu Comunications, Ltd., Vol. 8, Stereo Vision." Therefore, the description is omitted here.

Stereo vision attains depth images Da(x, y), Db(x, y) corresponding to the intensity images shot by the cameras 102a, 102b, respectively. Herein, (x, y) is an x-y coordinate value in the image plane described with reference to FIG. 4, and the element of each depth images is a Z coordinate value in the camera coordinate system. Then, a normal image Na(x, y) and a normal image Nb(x, y) are generated from the depth image Da(x, y) and the depth image Db(x, y), respectively. The elements of the normal image are three-dimensional directions $(n_x, n_y, n_z)$ of the unit normal vector in the camera coordinate system (X, Y, Z).

While various methods for computing a normal image from a depth image have been proposed, the following method is employed herein. In a depth image, when observing coordinates (i, j) as a target as in FIG. 25A, a triangular planes are defined between the observed point and the adjacent eight points with the use of the depth values of the eight neighbors, as shown in FIG. 25B. Then, the unit normal vectors of the triangle planes are computed and averaged to compute the unit normal vector N of the target pixel (i, j). The normal vector direction of each triangular plane can be computed from an outer product of two vectors forming the corresponding triangular plane. The above method is applied to all the pixels of the depth images Da, Db to obtain the normal images Na, Nb.

In the present embodiment, a distance value is once obtained by applying stereo vision to the diffuse reflection images obtained by reflection component separation, and then, the normal lines are computed. Alternatively, the normal lines are directly computed by utilizing stereo vision using the incident plane of specular reflection, as disclosed in "L. B. Wolff, "Surface orientation from two camera stereo with polarizers," in Proc. Opt. Illumination Image Sensing Machine Vision IV, Vol. 1194 (Philadelphia, Pa.), November 1989, pp. 287-297." In this conventional technique, in observing the same point on a subject by two cameras, specular reflection must be observed by both the two cameras. For detecting the corresponding points in two camera images, the previously described stereo vision utilizing the diffuse reflection component can be employed. With the corresponding points known, the normal line can be computed by stereo vision using the incident planes obtained from intensity variation of the specular reflection component.

Subsequently, in each of the incident angle computation sections 108a, 108b, the incident angle when specular reflection on the subject is observed by the cameras is computed in each pixel in which specular reflection is present (SC5).

Thereafter, in the respective classifying sections 109a, 109b, pixels similar to each other in both incident plane and incident angle are clustered in the respective image sets A, B (SC6). The processing herein is the same as the step SA4 in Embodiment 1, and therefore, the detail description is omitted.

Next, in the respective reflection component separation sections 110a, 110b, reflection component separation is performed on each set of pixels included in the same cluster in the respective image sets A, B (SC7). The pixels included in the same cluster have substantially the same incident planes. As to the incident angles, the normal lines have been computed with the use of the diffuse reflection component obtained in the j-th (j=0) reflection component separation, and therefore, the pixels more similar to each other in incident angle than those in the previous time are clustered. Then, reflection component separation is performed by utilizing again the method of Patent Document 2.

Each processing of the steps SC4 to SC7 as described above is repeated until the number of times reaches the predetermined number R of times, thereby achieving accurate reflection component separation.

It is noted that the above described refractive index estimation may be performed after reflection component separation is performed in accordance with the image processing method according to Embodiment 2.

INDUSTRIAL UTILIZATION

The present invention provides an image processing method for separating the diffuse reflection component and the specular reflection component from images shot under a general illumination condition, and accordingly, can be utilized as a preliminary processing for various image processing algorithms utilizing the diffuse reflection component. Further, the present invention can be utilized as the first step for modeling in the fields of CV (Computer Vision) and (CG (Computer Graphics) in which the reflection characteristic of an object is modeled onto a computer and the appearance thereof is rendered accurately.

What is claimed is:
1. An image processing method comprising the steps of:
(a) capturing a plurality of images of a subject under an arbitrary illumination condition by a camera through a polarizing element operable to set principal axes of which directions are different from each other, wherein the plurality of images are represented by image data;
(b) specifying an incident plane of each pixel of a pixel group in which specular reflection is present in the image data, wherein an incident plane has a direction;
(c) computing an incident angle of each pixel of the pixel group in the image data;
(d) performing a clustering algorithm on each pixel in the pixel group using a function dependent on both the direction of the incident plane and the incident angle of each pixel thereby forming at least one pixel set, wherein for each pixel the function determines a difference between the incident angle of the pixel and an incident angle corresponding to a center of a cluster, and a difference between the direction of the incident plane of the pixel and a direction of an incident plane corresponding to the center of the cluster, and wherein each pixel set is associated with a different cluster; and
(e) performing reflection component separation on the pixel set on an assumption of probabilistic independence between a diffuse reflection component and a specular reflection component to separate intensities of all the pixels thereof into the diffuse reflection component and the specular reflection component;
wherein steps (b), (c), (d), and (e) are performed on a processor.
2. The image processing method of claim 1,
wherein the step (b) includes the steps of:
computing a normal vector of the subject in each pixel of the pixel group; and
specifying an incident plane of each pixel of the pixel group from the computed normal vector of the subject in the pixel and a view-line vector in the pixel.
3. The image processing method of claim 1,
wherein the step (c) includes the steps of:
computing a normal vector of the subject in each pixel of the pixel group; and
computing an incident angle of each pixel of the pixel group from the computed normal vector of the subject in the pixel and a view-line vector in the pixel.
4. The image processing method of claim 2,
wherein the normal vector computing step includes the step of:
estimating a three-dimensional position and a three-dimensional posture of the subject in a camera coordinate system with the use of known three-dimensional geometry data of the subject on the basis of appearance of the subject in the captured images, and
a normal vector of the subject in each pixel of the pixel group is computed with the use of the estimated three-dimensional position and the estimated three-dimensional posture of the subject.
5. The image processing method of claim 3,
wherein the normal vector computing step includes the step of:
estimating a three-dimensional position and a three-dimensional posture of the subject in a camera coordinate system with the use of known three-dimensional geometry data of the subject on the basis of appearance of the subject in the captured images, and
a normal vector of the subject in each pixel of the pixel group is computed with the use of the estimated three-dimensional position and the estimated three-dimensional posture of the subject.
6. The image processing method of claim 1,
wherein the step (b) includes, when number of the captured images is three or larger, the step of:
detecting, in each pixel of the pixel group, a phase of intensity variation with respect to an angle of the principal axis of the polarizing element, and
an incident plane is specified from the detected phase.
7. An image processing method comprising the steps of:
(a) capturing a plurality of images of a subject under an arbitrary illumination condition by a camera through a polarizing element operable to set principal axes of which directions are different from each other, wherein the plurality of images are represented by image data;

(b) specifying an incident plane of each pixel of a pixel group in which specular reflection is present in the image data, wherein an incident plane has a direction;

(c) computing an incident angle of each pixel of the pixel group in the image data;

(d) forming at least one pixel set by clustering pixels similar to each other in both incident plane and incident angle in the pixel group; and (e) performing reflection component separation on the pixel set on an assumption of probabilistic independence between a diffuse reflection component and a specular reflection component to separate intensities of all the pixels thereof into the diffuse reflection component and the specular reflection component;

wherein the step (b) includes, when the number of the captured images is three or larger, a step of:

detecting, in each pixel of the pixel group, a phase of intensity variation with respect to an angle of the principal axis of the polarizing element, and an incident plane is specified from the detected phase;

wherein the step (c) includes steps of:

computing a normal vector of the subject in each pixel of the pixel group; and computing an incident angle of each pixel of the pixel group from the computed normal vector of the subject in the pixel and a view-line vector in the pixel, and the normal vector computing step includes, when number of the captured images is three or larger, the steps of:

computing a first two-dimensional distribution of directions obtained by projecting on an image plane the incident plane of each pixel of the pixel group, which is specified in the step (b);

provided a three-dimensional position and a three-dimensional posture of the subject in a camera coordinate system with the use of a known three-dimensional geometry model of the subject, calculating an incident plane of each pixel on an image plane on which the three-dimensional geometry model having the provided three-dimensional position and the provided three-dimensional posture is projected, and computing a second two-dimensional distribution of directions obtained by projecting the calculated incident planes onto an image plane;

determining a three-dimensional position and a three-dimensional posture of the subject by matching the first and second two-dimensional distributions; and computing a normal vector of the subject in each pixel of the pixel group on the basis of the determined three-dimensional position and the determined three-dimensional posture of the subject; and wherein steps (b), (c), (d) and (e) are performed on a processor.

8. The image processing method of claim 1, wherein after the step (b), a provisional clustering step of forming at least one pixel set by provisionally clustering pixels similar to each other in incident plane in the pixel group is executed, the step (e) is executed thereafter on the pixel set formed in the provisional clustering step, and then, the steps (c), (d), and (e) are repeated by a predetermined number of times, and the step (c) includes the steps of:

computing a normal vector of the subject in each pixel of the pixel group with the use of the diffuse reflection component obtained in the previously executed step (e); and computing an incident angle of each pixel of the pixel group from the computed normal vector of the subject in the pixel and a view-line vector in the pixel.

9. An image processing method comprising the steps of:

(a) capturing a plurality of images of a subject under an arbitrary illumination condition by a camera through a polarizing element operable to set principal axes of which directions are different from each other, wherein the plurality of images are represented by image data, wherein the number of the captured images is three or more;

(b) specifying an incident plane of each pixel of a pixel group in which specular reflection is present in the image data, wherein an incident plane has a direction;

(c) computing an incident angle of each pixel of the pixel group in the image data;

(d) forming at least one pixel set by clustering pixels similar to each other in both incident plane and incident angle in the pixel group; and (e) performing reflection component separation on the pixel set on an assumption of probabilistic independence between a diffuse reflection component and a specular reflection component to separate intensities of all the pixels thereof into the diffuse reflection component and the specular reflection component;

(f) computing, from intensity variation of the specular reflection component with respect to an angle of the principal axis of the polarizing element, a maximum value and a minimum value of intensity of a target pixel of the pixel group;

(g) computing a refractive index of the subject from a ratio of the computed maximum value to the computed minimum value and an incident angle of the target pixel computed in the step (c); and wherein steps (b), (c), (d), (e), (f) and (g) are performed on a processor.

10. An image processing method comprising the steps of:

(a) capturing a plurality of images of a subject under an arbitrary illumination condition by a camera through a polarizing element operable to set principal axes of which directions are different from each other, wherein the plurality of images are represented by image data, wherein the number of the captured images is three or more;

(b) specifying an incident plane of each pixel of a pixel group in which specular reflection is present in the image data, wherein an incident plane has a direction;

(c) computing an incident angle of each pixel of the pixel group in the image data;

(d) forming at least one pixel set by clustering pixels similar to each other in both incident plane and incident angle in the pixel group;

(e) performing reflection component separation on the pixel set on an assumption of probabilistic independence between a diffuse reflection component and a specular reflection component to separate intensities of all the pixels thereof into the diffuse reflection component and the specular reflection component;

(f) computing, from intensity variation of the specular reflection component with respect to an angle of the principal axis of the polarizing element, a minimum value of intensity of a target pixel of the pixel group;

(g) when the computed minimum value is smaller than a predetermined first threshold value, judging an incident angle of the target pixel computed in the step (c) as a Brewster's angle and computing a refractive index of the subject from the Brewster's angle; and wherein steps (b), (c), (d), (e), (f) and (g) are performed on a processor.

11. An image processing method comprising the steps of:

(a) capturing a plurality of images of a subject under an arbitrary illumination condition by a camera through a polarizing element operable to set principal axes of which directions are different from each other, wherein the plurality of images are represented by image data, wherein the number of the captured images is three or more;

(b) specifying an incident plane of each pixel of a pixel group in which specular reflection is present in the image data, wherein an incident plane has a direction;

(c) computing an incident angle of each pixel of the pixel group in the image data;

(d) forming at least one pixel set by clustering pixels similar to each other in both incident plane and incident angle in the pixel group;

(e) performing reflection component separation on the pixel set on an assumption of probabilistic independence between a diffuse reflection component and a specular reflection component to separate intensities of all the pixels thereof into the diffuse reflection component and the specular reflection component;

(f) computing, from intensity variation of the specular reflection component with respect to an angle of the principal axis of the polarizing element, a maximum value and a minimum value of intensity of a target pixel of the pixel group;

(g) computing, when the computed minimum value is equal to or larger than a predetermined second threshold value, a refractive index of the subject from a ratio of the computed maximum value to the computed minimum value and the incident angle of the target pixel computed in the step (c); and wherein steps (b), (c), (d), (e), (f) and (g) are performed on a processor.

12. An image processor comprising:

a polarized image acquisition section which captures an image of a subject under an arbitrary illumination condition through a polarizing element operable to set principal axes of which directions are different from each other;

an incident plane specifying section which specifies an incident plane of each pixel of a pixel group in which specular reflection is present in a plurality of images represented by image data captured by the polarized image acquisition section through the polarizing element operable to set principal axes of which directions are different from each other;

an incident angle computation section which computes an incident angle of each pixel of the pixel group in the image data;

a classifying section which performs a clustering algorithm on each pixel in the pixel group using a function dependent on both the direction of the incident plane and the incident angle of each pixel thereby forming at least one pixel set, wherein for each pixel the function determines a difference between the incident angle of the pixel and an incident angle corresponding to a center of a cluster, and a difference between the direction of the incident plane of the pixel and a direction of an incident plane corresponding to the center of the cluster, and wherein each pixel set is associated with a different cluster; and a reflection component separation section which performs reflection component separation on the pixel set formed by the classifying section on an assumption of probabilistic independence between a diffuse reflection component and a specular reflection component to separate intensities of all the pixels thereof into the diffuse reflection component and the specular reflection component.

13. An image processing program embedded in a computer readable medium which allows a computer to executes:

processing of taking a plurality of images of a subject captured under an arbitrary illumination condition through a polarizing element operable to set principal axes of which directions are different from each other and specifying an incident plane of each pixel of a pixel group in which specular reflection is present in the plurality of images wherein the plurality of images are represented by image data;

processing, on a processor, of computing an incident angle of each pixel of the pixel group in the image data;

processing of, on a processor, performing a clustering algorithm on each pixel in the pixel group using a function dependent on both the direction of the incident plane and the incident angle of each pixel thereby forming at least one pixel set, wherein for each pixel the function determines a difference between the incident angle of the pixel and an incident angle corresponding to a center of a cluster, and a difference between the direction of the incident plane of the pixel and a direction of an incident plane corresponding to the center of the cluster, and wherein each pixel set is associated with a different cluster; and performing, on a processor, reflection component separation on the pixel set on an assumption of probabilistic independence between a diffuse reflection component and a specular reflection component to separate intensities of all the pixels thereof into the diffuse reflection component and the specular reflection component.

14. An image processing method, comprising the steps of:

capturing a plurality of images of a subject under an arbitrary illumination condition by a camera through a polarizing element operable to set principal axes of which directions are different from each other, wherein the plurality of images are represented by image data;

specifying, on a processor, on the captured images a region uniform in refractive index and optically smooth in a local region;

specifying, on a processor, an incident plane of each pixel of a pixel group in which specular reflection is present in the region of the plurality of captured images;

computing, on a processor, an incident angle of each pixel of the pixel group in the region in the plurality of captured images;

performing, on a processor, a clustering algorithm on each pixel in the pixel group using a function dependent on both the direction of the incident plane and the incident angle of each pixel thereby forming at least one pixel set, wherein for each pixel the function determines a difference between the incident angle of the pixel and an incident angle corresponding to a center of a cluster, and a difference between the direction of the incident plane of the pixel and a direction of an incident plane corresponding to the center of the cluster, and wherein each pixel set is associated with a different cluster; and performing, on a processor, reflection component separation on the pixel set on an assumption of probabilistic independence between a diffuse reflection component and a specular reflection component to separate intensities of all the pixels thereof to the diffuse reflection component and the specular reflection component.

15. The image processing method of claim 14, wherein the subject is a human face, and in the region specifying step, an eye region or an eyeglass lens region is specified as the region.

* * * * *